(12) United States Patent
Khosravi-Mardkhe et al.

(10) Patent No.: US 9,289,750 B2
(45) Date of Patent: Mar. 22, 2016

(54) METHOD OF MAKING HIGHLY POROUS, STABLE ALUMINUM OXIDES DOPED WITH SILICON

(71) Applicant: Brigham Young University, Provo, UT (US)

(72) Inventors: Maryam Khosravi-Mardkhe, Rochester Hills, MI (US); Brian F. Woodfield, Provo, UT (US); Calvin H. Bartholomew, Orem, UT (US); Baiyu Huang, Orem (CN)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 14/201,538

(22) Filed: Mar. 7, 2014

(65) Prior Publication Data

US 2014/0256543 A1  Sep. 11, 2014

Related U.S. Application Data

(60) Provisional application No. 61/851,506, filed on Mar. 9, 2013.

(51) Int. Cl.

| | |
|---|---|
| *C01F 7/02* | (2006.01) |
| *B01J 21/12* | (2006.01) |
| *C01F 7/36* | (2006.01) |
| *C01F 7/44* | (2006.01) |
| *B01J 37/03* | (2006.01) |
| *B01J 35/10* | (2006.01) |

(52) U.S. Cl.
CPC . *B01J 21/12* (2013.01); *C01F 7/36* (2013.01); *C01F 7/441* (2013.01); *B01J 35/109* (2013.01); *B01J 35/1019* (2013.01); *B01J 35/1038* (2013.01); *B01J 35/1042* (2013.01); *B01J 35/1047* (2013.01); *B01J 35/1061* (2013.01); *B01J 37/03* (2013.01); *B01J 37/033* (2013.01); *C01F 7/02* (2013.01); *C01P 2002/72* (2013.01); *C01P 2004/04* (2013.01); *C01P 2004/53* (2013.01); *C01P 2004/82* (2013.01); *C01P 2006/12* (2013.01); *C01P 2006/14* (2013.01)

(58) Field of Classification Search
CPC .................................................... C01F 7/02
USPC ................................ 423/600, 625, 628, 631
See application file for complete search history.

(56) References Cited

U.S. PATENT DOCUMENTS

| | | |
|---|---|---|
| 2,457,719 A | 12/1948 | Pine et al. |
| 2,767,202 A | 10/1956 | Rottig |
| 2,786,817 A | 3/1957 | Rottig |
| 3,260,679 A | 7/1966 | Wennerberg et al. |
| 3,271,324 A | 9/1966 | Hirschler et al. |
| 3,900,387 A | 8/1975 | Wilhelm |
| 3,941,719 A | 3/1976 | Yoldas |
| 3,944,658 A | 3/1976 | Yoldas |
| 4,275,052 A | 6/1981 | Ryu |
| 4,392,988 A | 7/1983 | Dobson et al. |
| 4,422,960 A | 12/1983 | Shiroto et al. |
| 4,532,072 A | 7/1985 | Segal |
| 4,543,341 A | 9/1985 | Barringer et al. |
| 4,622,308 A | 11/1986 | Koikeda et al. |
| 4,622,311 A | 11/1986 | Wakui et al. |
| 5,128,081 A | 7/1992 | Siegel et al. |
| 5,227,407 A | 7/1993 | Kim |
| 5,328,501 A | 7/1994 | McCormick et al. |
| 5,358,695 A | 10/1994 | Helble et al. |
| 5,397,758 A | 3/1995 | Bouruetaubertot et al. |
| 5,417,956 A | 5/1995 | Moser |
| 5,455,019 A | 10/1995 | Inui et al. |
| 5,486,675 A | 1/1996 | Taylor et al. |
| 5,698,483 A | 12/1997 | Ong et al. |
| 5,927,621 A | 7/1999 | Ziolo et al. |
| 5,958,361 A | 9/1999 | Laine et al. |

(Continued)

FOREIGN PATENT DOCUMENTS

| | | |
|---|---|---|
| AU | 758256 | 3/2003 |
| AU | 2005203123 | 2/2006 |

(Continued)

OTHER PUBLICATIONS

Orefice et al., Sol-Gel Transition and Structional Evolution on Multicomponent Gels Derived from the Alumina-Silica System, Jul. 1996, Jounal of Sol-Gel Science and Technology, 9, 239-249.*

(Continued)

*Primary Examiner* — Matthew E Hoban
*Assistant Examiner* — James Fiorito
(74) *Attorney, Agent, or Firm* — Workman Nydegger

(57) ABSTRACT

The present invention relates to a method for making high surface area and large pore volume thermally stable silica-doped alumina (aluminum oxide) catalyst support and ceramic materials. The ability of the silica-alumina to withstand high temperatures in presence or absence of water and prevent sintering allows it to maintain good activity over a long period of time in catalytic reactions. The method of preparing such materials includes adding organic silicon reagents to an organic aluminum salt such as an alkoxide in a controlled quantity as a doping agent in a solid state, solvent deficient reaction followed by calcination. Alternatively, the organic silicon compound may be added after calcination of the alumina, followed by another calcination step. This method is inexpensive and simple. The alumina catalyst support material prepared by the subject method maintains high pore volumes, pore diameters and surface areas at very high temperatures and in the presence of steam.

13 Claims, 9 Drawing Sheets

(56) References Cited

U.S. PATENT DOCUMENTS

| | | |
|---|---|---|
| 6,027,706 A | 2/2000 | Pinnavaia et al. |
| 6,066,305 A | 5/2000 | Dugger et al. |
| 6,203,768 B1 | 3/2001 | McCormick et al. |
| 6,468,497 B1 | 10/2002 | Khan et al. |
| 6,503,475 B1 | 1/2003 | McCormick et al. |
| 6,506,493 B1 | 1/2003 | Kumar et al. |
| 6,558,847 B1 | 5/2003 | Kawakami et al. |
| 6,558,884 B1 | 5/2003 | Greener et al. |
| 6,600,127 B1 | 7/2003 | Peterson et al. |
| 6,620,351 B2 | 9/2003 | Gupta et al. |
| 6,660,897 B1 | 12/2003 | Marchal-George et al. |
| 6,749,648 B1 | 6/2004 | Kumar et al. |
| 6,749,966 B2 | 6/2004 | Reitz et al. |
| 6,777,639 B2 | 8/2004 | Schroder et al. |
| 6,803,027 B1 | 10/2004 | Virkar et al. |
| 6,962,946 B2 | 11/2005 | Brady et al. |
| 6,977,273 B2 | 12/2005 | Roy-Auberger et al. |
| 7,049,347 B2 | 5/2006 | Hu |
| 7,060,473 B2 | 6/2006 | Phelps et al. |
| 7,066,977 B2 | 6/2006 | Huang |
| 7,071,239 B2 | 7/2006 | Ortego, Jr. et al. |
| 7,081,267 B2 | 7/2006 | Yadav |
| 7,087,100 B2 | 8/2006 | Lewis et al. |
| 7,105,145 B2 | 9/2006 | Seol et al. |
| 7,118,727 B2 | 10/2006 | Williams |
| 7,125,536 B2 | 10/2006 | Fu et al. |
| 7,163,963 B2 | 1/2007 | Fraenkel |
| 7,259,286 B2 | 8/2007 | Jothimurugesan et al. |
| 7,452,844 B2 | 11/2008 | Hu et al. |
| 8,211,388 B2 | 7/2012 | Woodfield et al. |
| 8,216,963 B2 | 7/2012 | Kibby et al. |
| 8,226,740 B2 | 7/2012 | Chaumonnot et al. |
| 8,324,128 B2 | 12/2012 | Rytter et al. |
| 2002/0028745 A1 | 3/2002 | Krylova et al. |
| 2002/0110517 A1 | 8/2002 | James et al. |
| 2002/0187889 A1 | 12/2002 | Lauf et al. |
| 2003/0019328 A1 | 1/2003 | Dunmead et al. |
| 2003/0032192 A1 | 2/2003 | Haubold et al. |
| 2003/0051580 A1 | 3/2003 | Lewis et al. |
| 2003/0102099 A1 | 6/2003 | Yadav et al. |
| 2003/0124043 A1 | 7/2003 | Yadav et al. |
| 2003/0126948 A1 | 7/2003 | Yadav et al. |
| 2003/0138368 A1 | 7/2003 | Yadav et al. |
| 2003/0162849 A1 | 8/2003 | Van Berge et al. |
| 2003/0180213 A1 | 9/2003 | Carnes et al. |
| 2004/0005485 A1 | 1/2004 | Yadav et al. |
| 2004/0009118 A1 | 1/2004 | Phillips et al. |
| 2004/0086452 A1 | 5/2004 | Seol et al. |
| 2004/0108220 A1 | 6/2004 | Stephan et al. |
| 2004/0120884 A1 | 6/2004 | Sherman |
| 2004/0122115 A1 | 6/2004 | Espinoza et al. |
| 2004/0178530 A1 | 9/2004 | Yadav |
| 2004/0231464 A1 | 11/2004 | Kurihara et al. |
| 2005/0031517 A1 | 2/2005 | Chan |
| 2005/0053538 A1 | 3/2005 | Holloway et al. |
| 2005/0063889 A9 | 3/2005 | Yadav et al. |
| 2005/0063898 A1 | 3/2005 | Ja Chisholm |
| 2005/0119398 A1 | 6/2005 | Zhang |
| 2005/0191492 A1 | 9/2005 | Yadav |
| 2005/0214916 A1 | 9/2005 | Absar et al. |
| 2005/0228202 A1 | 10/2005 | Nappa et al. |
| 2005/0245623 A1 | 11/2005 | Van Berge et al. |
| 2005/0260122 A1 | 11/2005 | Li et al. |
| 2005/0271566 A1 | 12/2005 | Yadav |
| 2006/0084278 A1 | 4/2006 | Winter et al. |
| 2006/0110314 A1 | 5/2006 | Torardi |
| 2006/0115411 A1 | 6/2006 | Jensen et al. |
| 2008/0032132 A1 | 2/2008 | Woodfield et al. |
| 2009/0023581 A1 | 1/2009 | DiMonte et al. |
| 2009/0036558 A1 | 2/2009 | Font et al. |
| 2010/0174002 A1 | 7/2010 | Kibby et al. |
| 2011/0257008 A1* | 10/2011 | Bartholomew et al. ....... 502/407 |
| 2012/0122671 A1 | 5/2012 | Polli et al. |
| 2013/0184360 A1 | 7/2013 | Eri et al. |

FOREIGN PATENT DOCUMENTS

| | | |
|---|---|---|
| CN | 1184703 | 6/1998 |
| CN | 1477050 | 2/2004 |
| CN | 1478724 | 3/2004 |
| CN | 1660530 | 8/2005 |
| CN | 1986409 | 6/2007 |
| CN | 101384511 | 3/2009 |
| DE | 10163399 | 7/2003 |
| DE | 102004016131 | 10/2005 |
| EP | 0190883 A2 | 8/1986 |
| EP | 0735001 | 10/1996 |
| EP | 1894626 | 3/2008 |
| EP | 2392548 A1 | 12/2011 |
| JP | 2003-034526 | 2/2003 |
| JP | 2003-267704 | 9/2003 |
| JP | 2005-263615 | 9/2005 |
| JP | 2005-336019 | 12/2005 |
| JP | 2006-16236 | 1/2006 |
| JP | 2009-527365 | 7/2009 |
| WO | WO 00/24676 | 5/2000 |
| WO | WO 02/055240 | 7/2002 |
| WO | WO 02/060623 | 8/2002 |
| WO | 03/012008 A2 | 2/2003 |
| WO | WO 03/014011 | 2/2003 |
| WO | WO 03/031323 | 4/2003 |
| WO | WO 03/076338 | 9/2003 |
| WO | WO 2004/007357 | 1/2004 |
| WO | WO 2004/092069 | 10/2004 |
| WO | WO 2005/026045 | 3/2005 |
| WO | 2005/060448 A2 | 7/2005 |
| WO | WO 2005/060610 | 7/2005 |
| WO | WO 2005/077505 | 8/2005 |
| WO | WO 2005/080271 | 9/2005 |
| WO | WO 2005/118465 | 12/2005 |
| WO | WO 2006/000049 | 1/2006 |
| WO | 2006/070203 | 7/2006 |
| WO | 2007/009680 A1 | 1/2007 |
| WO | WO 2007/098111 | 8/2007 |
| WO | 2009/061707 | 5/2009 |

OTHER PUBLICATIONS

U.S. Appl. No. 13/069,317, filed May 15, 2014, Restriction Requirement.

U.S. Appl. No. 13/836,850, filed Jun. 9, 2014, Office Action.

U.S. Appl. No. 13/836,985, filed Jul. 1, 2014, Office Action.

U.S. Appl. No. 13/069,317, filed Jul. 31, 2014, Office Action.

U.S. Appl. No. 11/707,840, filed Feb. 16, 2007, Brian F. Woodfield et al.

U.S. Appl. No. 13/069,317, filed Mar. 22, 2011, Calvin H. Bartholomew et al.

U.S. Appl. No. 13/836,850, filed Mar. 15, 2013, Brian F. Woodfield et al.

U.S. Appl. No. 13/836,985, filed Mar. 15, 2013, Brian F. Woodfield et al.

Lin, Y. et al., "Preparation of Nanometers Zinc Oxide Powders by Plasma Pyrolysis Technology and Their Applications", J. Am. Cream. Soc., vol. 83(11), pp. 2869-2871, (2000).

Sun, Ya-Ping et al., Preparation of Nickel, Cobalt, and Iron Nanoparticles Through the Rapid Expansion of Supercritical Fluid Solutions, (RESS) and Chemical Reduction, Chemistry of Materials, Jan. 1999, pp. 7-9, vol. 11, No. 1, American Chemical Society, Washington, US.

Liu, Yan-Li et al, Simple synthesis of $MgFe_2O_4$ nanoparticles and gas sensing materials, Sensors and Actuators B, Jun. 29, 2005, pp. 600-604, vol. 107, No. 2, Elsevier.

PCT Application No. PCT/US2007/004279, International Search Report and The Written Opinion of the International Searching Authority, Mailed Sep. 11, 2007.

International National Search Report for PCT/US2011/029472 dated Nov. 28, 2011.

Wang, J. et al., Synthesis and characterization of ZnO nanoparticles assembled in one-dimensional order, Inorganic Chemistry Communications, vol. 6 877-881 (2003).

(56) References Cited

OTHER PUBLICATIONS

Li, Z., et al., Non-isothermal kinetics studies on the thermal decomposition of zinc hydroxide carbonate, Thermochimica ACTA, vol. 438, 102-106 (2005).

Lin, et al. "Characterisation of ZnO-based Varistors Prepared from Nanometre Precursor Powders", Advanced Materials for Optics and Electronics, Adv. Mater. Opt. Electron. 9, pp. 205-209 (1999).

Matson, D. W et al., Ultrafine Iron Oxide Powders generated using a flow-through hydrothermal process, Mater. Lett. 1992, pp. 222-226, vol. 14, No. 4.

Kang, Y.C. et al, Preparation of Nanometre size oxide particles using filter expansion aerosol generator, Journal of Materials Science, 1996, pp. 2409-2416, vol. 31, No. 9.

Choy, H. et al., Citrate Route to the Piezoelectroic $Pb(Zr,Ti)O_3$ Oxide, J. Mater Chem., 1997, pp. 1815-1820. vol. 7, No. 9.

Reverchon, E. et al, Supercritical antisolvent precipitation of nanoparticles of superconductor precursors, Industrial & Engineering Chemistry Research, 1998, pp. 952-958, vol. 37, No. 3.

Meulenkamp, E. A., Synthesis and growth of ZnO nanoparticles, Journal of Physical Chemistry B, Jul. 16, 1998, pp. 5566-5572. vol. 102, No. 29, ACS, USA.

Chicheng, Ma et al, A New Combined Process for Production of Fine Alumina Powders, Engineering chemistry and metallurgy, vol. 20, No. 4, 1999. (English Abstract).

Mizukoshi, Y. et al., Preparation of platinum nanoparticles by sonochemical reduction of the Pt(II) Ion, Langmuir, pp. 2733-2737, Apr. 13, 1999, vol. 15, No. 8, American Chem. Soc., US.

Camargo, E. R. et al., Pyrochlore-free $Pb(Mg_{1/3}Nb_{2/3})O_3$ prepared by a combination of the partial oxalate and the polymerized complex methods, Journal of Alloys and Compounds, Jan. 16, 2001, pp. 140-146, vol. 314, Elsevier, Switzerland.

Zhuang, Jia et al., Study on nanophase cobalt oxide ($Co_3O_4$) fabrication by a solid-state reaction at ambient temperatures, Journal of Inorganic Materials, pp. 1203-1206, vol. 16, No. 6, Nov. 2001. (English Abstract).

Zhang, Feng et al., Cerium oxide nanoparticles: Size-selective formation and structure analysis, American Institute of Physics, Jan. 7, 2002, pp. 127-129.vol. 80, No. 1.

Hao, Chen et al., The Technique for Preparing Nanometer $Al_2O_3$ Powder with Chemical Method, Materials for mechanical engineering, Jul. 2002, pp. 25-27, vol. 26, No. 7.

Liu, Jian-Ben et al, Preparation of Nanometer-Sized ZnO Particles by Gass-Solid Phase Reaction, Fine Chemical Intermediates, Oct. 2002, pp. 26-27, vol. 32, No. 5. (English Abstract).

Yang, Yang et al., ZnO nanoparticles prepared by thermal decomposition of beta-cyclodextrin coated zinc acetate, Chemical Physics Letters, May 13, 2003, pp. 22-27, vol. 373, No. 1-2, Elsevier, Netherlands.

Shen, Xiao-Qing et al, Preparation of nanosized alumia powders by pyrolysis of ammonium aluminum carbonate hydroxide, Chinese Journal of Inorganic Chemistry, Jun. 2003, pp. 650-654, vol. 19, No. 6. (English Abstract).

Sun, Xudong et al. Synthesis of Nanocrystalline $\alpha$-$Al_2O_3$ Powders from Nanometric Ammonium Aluminum Carbonate Hydroxide, Journal of the American Ceramic Society—Sun et al., 2003, pp. 1321-1325, vol. 86, No. 8.

Makela, J.M. et al, Generation of metal and metal oxide nanoparticles by liquid flame spray process, Journal of Materials Science, Apr. 15, 2004, pp. 2783-2788, vol. 39, No. 8.

Yuan, Fangli et al., Preparation of zinc oxide nanoparticles coated with homogeneous $Al_2O_3$ layer, Materials of Science and Engineering, Oct. 28, 2004, pp. 55-60.

Li, Jiang et al., Effects of $\alpha$-$Al_2O_3$ Seeds on the Phase Transformation and Microstructure of Alumina, Journal of Inorganic Materials, Nov. 2004, pp. 1293-1297, vol. 19, No. 6. (English Abstract).

Jha, R K et al., Synthesis of Bismuth Oxide Nanoparticles using Bismuth Nitrate and Urea, Ceramics International, 2005, pp. 495-497, vol. 31, No. 3, Elsevier Science Ltd., Oxford, UK.

Vale, Damaris et al., Production of Nanoparticles of Aluminum Oxide by Decomposition of Aerosols of Aluminum Nitrate Solution in a Flame, Transactions of the American Nuclear Society, 2005, pp. 352-353, vol. 92, American Nuclear Society, Inc., La Grange Park, IL, USA.

Patil, M M et al., Synthesis of Bismuth Oxide Nanoparticles at 100 C, Materials Letters, 2005, pp. 2523-2525, vol. 59, No. 19/20, Elsevier, BV, Amsterdam, Netherlands.

Tani, T. et al., Effects of solvent on powder characteristics of zinc oxide and magnesia prepared by flame spray pyrolysis, Nippon Seramikkusu Kyokai Gakujutsu Ronbunishi (Journal of Ceramic Society of Japan), 2005, pp. 255-258, vol. 113, No. 3, Nippon Seramikkusu Kyokai, Tokyo, Japan.

Niederberger, M. et al, Non-aqueous routes to crystalline metal oxides nanoparticles: Formation mechanisms and applications, Progress Solid State Chemistry, 2005, pp. 59-70, vol. 33, No. 2¬ 4, Elsevier, UK.

Li, Feng et al., One-step solid-state reaction synthesis and gas sensing property of tin oxide nanoparticles, Sensors and Actuators B, Jan. 5, 2005, pp. 165-169, vol. 81, No. 2-3, Elsevier Sequoia S.A., Lausanne, CH.

Wang, Xiong et al., Optical and electrochemical properties of nanosized NiO via thermal decomposition of nickel oxalate nanofibres, Nanotechnology, Jan. 2005, pp. 37-39, vol. 16, No. 1.

Chen, Yixian et al., Preparation. and characterization of palladium colloidal nanoparticles by thermal decomposition of palladium acetate with microwave irradiation, Journal of Materials Science & Technology, Mar. 2005, pp. 187-190, vol. 21, No. 2, Editorial Board J. Mater. Sci. & Technol, China.

Dar, M A et al., Preparation and characterization of alpha-FeOOH and alpha-$Fe_2O_3$ by sol-gel method, Journal of Materials Science, Jun. 2005, pp. 3031-3034, vol. 40, No. 11, Kluwer, Norwell, MA, USA.

Nethravathi, C. et al., Ferrimagnetic nanogranular $Co_3O_4$ through solovothennal decomposition of colloidally dispersed monolayers of $\alpha$-cobalt hydroxide, Journal of Physical Chemistry B, Jun. 16, 2005, pp. 11468-11472, vol. 109, No. 23.

Morales, J. et al., Synthesis and characterization of nanometric iron and iron-titanium oxides by mechanical milling: electrochemical properties as anodic materials in lithium cells, Journal of Electrochemical Society, Sep. 2005, pp. A1748-A1754, vol. 152, No. 9, Electrochem. Soc, USA.

Carja, G. et al., From the organized nanoparticles of copper and vanadium containing LDHs to the small nanoparticles of mixed oxides: A simple route, Mater. Lett (Netherlands), Oct. 2005, pp. 3078-3080, vol. 59, No. 24-25, Elsevier, Netherlands.

You-Cheng, Wu et al., Synthesis of $Al_2O_3$ nanopowders by electrical explosion of wires, High Power Laser and Particle Beams, Nov. 2005, pp. 1753-1756, vol. 17, No. 11, IEE, Nucl. Soc., China. (English Abstract).

Muller, A. et al., Polyol method for the preparation of nanosized $Gd_2O_3$, boehmite and other oxides, Materials Research Bulletin, Dec. 8, 2005, pp. 2153-2169, vol. 40, No. 12, Elsevier, USA.

Polarz, Sebastian et al., Molecular encoding at the nanoscale: From complex cubes to bimetallic oxides, Angewandte Chemie—International Edition, Dec. 9, 2005, pp. 7892-7896, vol. 44, No. 48.

Zhang, Maolin et al., Novel preparation of nanosized $ZnO$-$SnO_2$ with high photocatalytic activity by homogeneous co-precipitation method, Materials Letters, Dec. 2005, pp. 3641-3644, vol. 59, No. 28, Elsevier, Netherlands.

Callone, E. et al., Nanopowders of metallic oxides prepared by the hydrolytic route with starch stabilization and biological abetment, Journal of Nanoscience and Nanotechnology, Jan. 2006, pp. 254-257, vol. 6, No. 1, American Scientific Publishers, USA.

Zhang, Yan Feng et al., Synthesis and characterization of $Ca_3Co_4O_9$ nanoparticles by citrate sol-gel method, Mater Lett, Sep. 2006, pp. 2443-2446, vol. 60, No. 20.

Shao, Huiping et al., Cobalt nanoparticles synthesis from $Co(CH_3COO)_2$ by thermal decomposition, Journal of Magnetism and Magnetic Materials, Sep. 2006, pp. e28-e30, vol. 304, No. 1.

Vasylkiv, Oleg et al, Nonisothermal synthesis of yttria-stabilized zirconia nanopowder through oxalate processing. I-Characteristics of Y—Zr oxalate synthesis and its decomposition, American Ceramic Society, Sep. 2000, pp. 2196-2002, vol. 83, No. 9.

(56) References Cited

OTHER PUBLICATIONS

Xu, J.L. et al, RF induction plasma synthesized calcium phosphate nanoparticles, Key Engineering Materials, vols. 309-311, May 2006, pp. 511-514, Trans Tech Publications, Switzerland.

Tsuzuki, Takuya et al., ZnO Nanoparticles Synthesised by Mechanochemical Process, Scripta Materialia, 2001, pp. 1731-1734, vol. 44, Nos. 8/9.

Wostek-Wojiciechowska, Dorota, et al., The solid-state synthesis of metal nanoparticles from organometallic precursors, Journal of Colloid and Interface Science, Jul. 1, 2005, pp. 107-113, vol. 287, No. 1, Academic Press, New York, NY, USA.

Zhijian, Wang, et al, Low-temperature synthesis of ZnO nanoparticles by solid-stae pyrolytic reaction, Nanotechnology, Jan. 1, 2003, pp. 11-15, vol. 14, No. 1,10P, Bristol, GB.

U.S. Appl. No. 11/707,840, Nov. 27, 2009, Restriction Requirement.
U.S. Appl. No. 11/707,840, Apr. 1, 2010, Office Action.
U.S. Appl. No. 11/707,840, Oct. 14, 2010, Final Office Action.
U.S. Appl. No. 11/707,840, Jan. 27, 2011, Interview Summary.
U.S. Appl. No. 11/707,840, Jan. 27, 2011, Advisory Action.
U.S. Appl. No. 11/707,840, May 24, 2011, Office Action.
U.S. Appl. No. 11/707,840, Dec. 28, 2011, Final Office Action.
U.S. Appl. No. 11/707,840, Mar. 8, 2012, Notice of Allowance.
U.S. Appl. No. 13/836,850, Oct. 24, 2014, Final Office Action.
U.S. Appl. No. 13/836,985, Dec. 3, 2014, Final Office Action.
U.S. Appl. No. 13/836,850, Dec. 22, 2014, Notice of Allowance.
U.S. Appl. No. 13/836,985, Mar. 5, 2015, Notice of Allowance.

Petrik, L. "The influence of cation, anion and water content on the rate of formation and pore size distribution of zeolite ASM-5," South African Journal of Science, vol. 105, pp. 251-257, 2009.

Wu W et al. "Preparation of nanocrystalline zinc carbonate and zinc oxide via solid-state reaction at room temperature," Materials Letters, North Holland Publishing Company, Amsterdam, NL, vol. 60, No. 21-22, Sep. 1, 2006, pp. 2791-2794.

Supplemental European Search Report from Application No. EP 11760091 dated May 6, 2015.

U.S. Appl. No. 13/069,317, Feb. 12, 2015, Final Office Action.
U.S. Appl. No. 13/836,850, Apr. 17, 2015, Notice of Allowance.

J.W. Curley, M.J. Dreelan, O.E. Finlayson, *Catalysis Today*: High Temperature Stability of Alumina Fibre, 10 (1991) 401-404.

J. van de Loosdrecht, S. Barradas, E.A. Caricato, P.J. van Berge, and J.L.Visagie, *Studies in Surface Science and Catalysis*: Support Modification of Cobalt Based Slurry Phase Fischer-Tropsch Catalysts, 143 (2002) 587.

A.A. Shutilov, G.A.Zenkovets, S.v. Tsybulya, V.Y. Gavrilove, *Kinetics and Catalysis*: Effect of Silica on the Stability of the Nanostructure and Texture of Fine-Particle Alumina, 53, (2012) 125-136.

A.W. Espie, J.C. Vickerman, *Journal of the Chemical Society, Faraday Transactions 1*: Physical Chemistry in Condensed Phases, 80(1984) 1903-1913.

T.Fukui, M. Hori, *Journal of Materials Science*: Control of micropore size distribution in alumina by the hydrothermal treatment of an alkoxide derived-alcogel, 31 (1996) 3245-3248.

Beguin et al., *Journal of Catalysis*: Stabilization of Alumina toward Thermal Sintering by Silicon Addition, 127 (1991) 595-604.

\* cited by examiner

METHOD OF MAKING HIGHLY POROUS, STABLE ALUMINUM OXIDES DOPED WITH SILICON

CROSS-REFERENCE TO RELATED APPLICATIONS

This application is a non-provisional of, and claims priority to and the benefit of, U.S. Provisional Patent Application Ser. No. 61/851,506 filed on Mar. 9, 2013 and entitled "A METHOD OF PRODUCING THERMALLY STABLE AND HIGH SURFACE AREA $Al_2O_3$ CATALYST SUPPORTS," which application is hereby expressly incorporated herein in its entirety by this reference.

GOVERNMENT RIGHTS

This invention was made with government support under contract # DE-FG02-05ER15666 awarded by the Department of Energy. The government has certain rights in the invention.

BACKGROUND OF THE INVENTION

1. The Field of the Invention

Alumina is the most common catalyst support used in industry and it has numerous applications as a ceramic material. Gamma alumina ($\gamma$-$Al_2O_3$) is preferred for many catalyst systems including Pt, Pd, and Ni for hydrogenation reactions, for Pt, Rh and Pd catalysts for internal combustion engine emissions control (CO, NOx), for Co(Ni)—Mo(W) sulfide catalysts for fuel hydrodesulfurization, and for Co and Fe catalysts for Fischer-Tropsch synthesis (FTS). Alumina is prepared inexpensively with a wide range of surface areas and porosities, and is more thermally stable than other metal oxide supports. There are three important properties in selecting an appropriate catalyst support. First, high surface area supports increase catalyst dispersion and catalytic reaction sites, which leads to decreased reaction times and catalyst usage. Second, optimal pore size is important in support materials since various catalytic systems require unique pore sizes for better diffusion and selectivity. Third, thermal stability is important since many catalytic reactions take place at elevated temperatures over long periods of time. However, at high temperatures and pressures, $\gamma$-$Al_2O_3$ is deactivated by sintering and a crystalline lattice phase transformation from $\gamma$ to $\alpha$-$Al_2O_3$ which causes a sharp decrease in surface area and pore size. And, the metal catalysts on such a support become occluded in the shrunken material, resulting in a loss of exposed catalyst surface area, or they are expelled from the support, resulting in a significant deactivation of the catalyst.

In order to prevent sintering and suppress catalyst deactivation, methods to stabilize $\gamma$-$Al_2O_3$ supports against thermal deactivation have been developed by adding a dopant which may affect the porous structure and surface properties of the materials and improve their thermal stability. Thermal stability of alumina increases with silica, zirconia, rare earth elements such as lanthanum and chelating agents (ethyl acetoacetate). Several methods for synthesis of stable silica doped alumina have been reported, e.g., impregnation; precipitation/washing; and gel, areogel, and cryogol methods employing various solvents and/or surfactants and templates. These methods are costly and time consuming. Moreover, these supports, with few exceptions, do not maintain high surface areas and pore volumes at higher temperatures. Such materials are described in, e.g., J. W. Curley, M. J. Dreelan, O. E. Finlayson, Catalysis Today, 10 (1991) 401-404, in J. van de Loosdrecht, S. Barradas, E. A. Caricato, P. J. van Berge, and J. L. Visagie, Studies in Surface Science and Catalysis, 143 (2002) 587; in A. A. Shutilov, G. A. Zenkovets, S. v. Tsybulya, V. Y. Gavrilove, Kinetics and Catalysis, 53, (2012) 125-136; in A. W. Espie, J. C. Vickerman, Journal of the Chemical Society, Faraday Transactions 1: Physical Chemistry in Condensed Phases, 80 (1984) 1903-1913, and in T. Fukui, M. Hori, Journal of Materials Science, 31 (1996) 3245-3248; in_Beguin et al., Journal of Catalysis, 127 (1991) 595.

WO 2007/009680 discloses treatment of alumina with an organic siloxide, i.e. $Si(OR)_{4-n}R'n$ including TEOS. U.S. Pat. No. 6,977,273 discloses impregnating Sasol Puralox gamma-alumina with TEOS. (3) US 2003/0162849, WO 03/012008, and US Patent 2005/0245623 discloses addition of TEOS/ethanol or other organic silicon compounds in ethanol to an alumina support to improve mechanical and thermal/hydrothermal stabilities and resistance to sintering.

U.S. Pat. No. 4,392,988 discloses that soaking alumina in polydimethyl-siloxane increases thermal stability of alumina. EPO 2,392,548 describes a method for the preparation of an amorphous silica-alumina with acid properties like zeolites, using silica to alumina weight ratio of 2. The method includes: co-precipitation of alumina and silica by adding a base precipitating agent to an aqueous solution of sodium silicate and aluminum sulfate in presence of a gelification initiator (bohemite) followed by filtration and drying. After calcination at 550° C. the surface area and a pore volume are 400 $m^2/g$ and 1.2 $cm^3/g$, respectively. But, the silica content in such silica-alumina is high which may make it less stable at higher temperatures. The acidity of this support is also high which make it undesirable for some catalytic reactions such as Fischer-Tropsch.

EPO Patent 1,701,787 discloses a silica-modified-alumina with 2-10% silica using a cogel method. After calcination at 648° C., the material has a surface area and pore volume of 318 $m^2/g$ and 0.46 $cm^3/g$, respectively. There is no data available at higher temperatures. EPO Patent 0190883 discloses a stabilized 5.5% silica-alumina support produced by impregnating alumina with polyorgano silane. After calcination at 1100° C. and 1200° C., the surface area is 158.2 $m^2/g$ and 93 $m^2/g$, respectively. No data are available for pore volume.

Huang et al. (U.S. Provisional Patent Application 61/340, 762 corresponding to application Ser. No. 13/069,317 filed Mar. 22, 2011 previously disclosed a simple method of preparing $\gamma$-$Al_2O_3$ supports which have high surface areas (>350 $m^2/g$) and pore volumes (>1.7 $cm^3/g$); and in which the pore diameters can be controlled over a large range (3 to 55 nm) made by an inexpensive, solvent deficient method without the use of templates or surfactants. However, pore volume and surface area decrease sharply to about 60 $m^2/g$ at approximately 1000° C. due to the $\gamma$ to $\alpha$-$Al_2O_3$ transition. Doping with 3% La increases the thermal stability somewhat to achieve a surface area of 139 $m^2/g$ and pore volume of 0.22 $cm^3/g$ at 1100° C. Moreover, these supports tend to collapse in the presence of water or steam.

Thus, the need is clear for development of methods for synthesizing alumina catalyst supports with improved stability at high temperatures (e.g., above 1100° C.) in the presence of water/steam, i.e., materials which maintain high surface area, large pore volume medium to large mesopore diameter, under these demanding conditions. Such catalyst supports can be used to facilitate higher catalyst loading and dispersion with attendant increases in catalytic activity, selectivity, productivity, and lifetime at these operating temperatures. It is also desirable to produce such materials using simple manufacturing methods with associated low costs of manufacturing.

Table 1 shows surface areas, pore diameters, and pore volumes for different $Al_2O_3$, and $Si—Al_2O_3$ supports available commercially and reported in the literature.

| Sample ID | BET surface area ($m^2/g$) | | | Mesopore volume ($cm^3/g$) | | | Pore Diameter (nm) | | | Alumina phase | |
|---|---|---|---|---|---|---|---|---|---|---|---|
| | 700 | 1100 | 1200 | 700 | 1100 | 1200 | 700 | 1100 | 1200 | 1100 | 1200 |
| 5% Si/Al$_2$O$_3$ (SIRAL 5-Sasol)a | 288 | 128 | 73 | 0.61 | 0.4 | 0.23 | 7.7 | 11.2 | 11.4 | Gamma & Alpha | Gamma & Alpha |
| 5% Si/Al$_2$O$_3$[1]b | — | 120 | 110 | — | 1.28 | 0.9 | — | 10.8 | 18.6 | Theta | Theta |
| 10% Si/Al$_2$O$_3$[2]c | — | 100 | 47 | — | 0.2 | 0.1 | — | 3.5 | 3.5 | Gamma | Gamma |
| 10% Si/Al$_2$O$_3$[3]a | — | — | 150 | — | — | 0.65 | — | — | — | — | Alpha & Gamma |
| a)5% Si/Al$_2$O$_3$[4]d | 187 | 68 | — | 0.57 | 0.35 | — | 7.4 | 15.0 | — | Alpha & Theta | — |

Calcined for:
a 2 h,
b 1 h,
c 5 h,
d 4 h

[1] T. Horiuchi, T. Osaki, T Sugiyama, H. Masuda, M. Horio, K. Suzuki, T. Mori, T. Sago, Journal of the Chemical Society, Faraday Transactions, 90 (1994) 2573-2578
[2] Osaki, T.; Nagashima, K.; Watari, K.; Tajiri, K., Journal of Non-Crystalline Solids 2007, 353, (24-25), 2436-2442.
[3] J. B. Miller, E. I. Ko, Catalysis Today, 43 )1998) 51-67
[4] A. A. Shutilov, G. A. Zenkovets, S. V. Tsybulya, V. Y. Gavrilov, Kinetics and Catalysis, 53 125-136.

SUMMARY OF THE INVENTION

This invention comprises a method for preparation of a silica doped alumina which maintains high surface areas, large pore volumes and large pore diameters at elevated temperatures, such as about 1200° C. in the presence or absence of water (or steam). The method produces silica-stabilized alumina nanoparticles highly resistant to sintering or fusing with consequent grain growth and conversion of the γ to the α crystalline lattice structure, thus maintaining optimal surface area and pore structure s. The silica-doped alumina is produced by a unique solid-state, solvent-deficient synthesis method combined with a novel method of doping with an organic silicon reagent to produce products of superior thermal and hydrothermal stability and pore characteristics.

The invention may be practiced by either of two alternative methods as a "One Step" or "Two Step" method:

One Step: An organic silicon compound such as tetraethyl orthosilicate (TEOS) is mixed with an organic aluminum salt such as aluminum isopropoxide and a small amount of water in a solvent deficient environment to produce doped alumina precursor nanoparticles. The organic silicon compound used may vary in concentration to yield from about 1% to about 30% by weight of silica in the final product. The aluminum alkoxide and the organic silicon compound form a precursor in the form of a solid suspension or slurry. Upon further stirring, the slurry may thicken to a slightly-wet solid. The precursor (with or without drying to remove the water and by-product volatile alcohols) is dried at 25-200° C. and calcined by heating to 500-800° C. (e.g., to 700° C. for 2 hrs., ramp rate, 5 hrs.) to form a stable silica-doped aluminum oxide ("SDA" herein) with evaporation of all byproducts.

Two Step:
a) An organic aluminum salt such as aluminum isopropoxide and a small amount of water are mixed in a solvent deficient environment to produce an alumina nanoparticle precursor in the form of a slurry. The alumina precursor (with or without drying to remove the water and by-product volatile alcohol) is calcined (e.g., at 700° C. for 2 hrs., ramp rate, 5 hrs.) to form aluminum oxide with evaporation of all byproducts.

b) An organic silicon compound such as TEOS is mixed with the alumina produced in step a) and with a small amount of water sufficient to hydrolyze the TEOS. The organic silicon compound may vary in concentration to yield from about 1% to about 30% by weight of silica in the final product. The mixture is calcined (e.g., at 700° C. for 2 hrs., ramp rate, 5 hrs.) to form the stable silica doped aluminum oxide (SDA) with evaporation of all byproducts.

Examples of appropriate organic aluminum salts include, but are not limited to aluminum isopropoxide, aluminum phenoxide, aluminum sec-butoxide, aluminum tert-butoxide, aluminum ethoxide, and aluminum hexoxide. Examples of organic silicon compounds include, but are not limited to: teraethyl ortho silicate, tetra-n-butoxysilane, tetra n-propoxy silane, polydimethyl siloxane, and triethoxy methyl silane.

DETAILED DESCRIPTION OF THE PREFERRED EMBODIMENTS

Figure 1A:
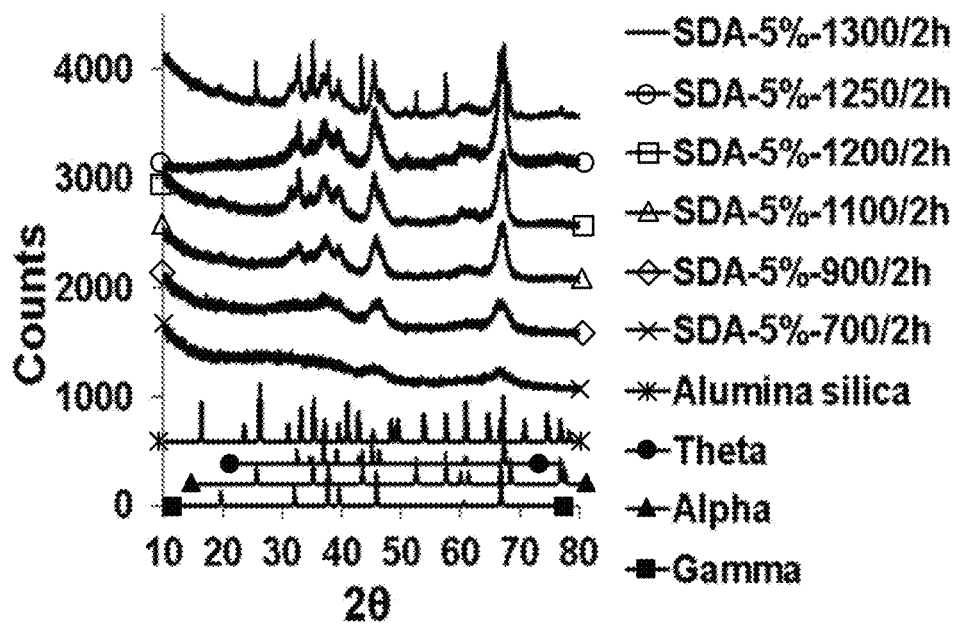
FIGS. 1A) and 1B) also show XRD patterns for standard alumina phases including "Mullite" (3:1 weight % alumina/silica, also designated as "Alumina silica" in FIG. 1A and other Examples) as well as alpha, theta, and gamma phases. XRD standard patterns described in this and other Examples to follow were compared to an XRD standard pattern for alpha, gamma, theta and mullite phases in the International Centre for Diffraction Data (ICDD) database software.

The following descriptions and examples illustrate the preferred embodiments of the present invention in detail. Those of skill in the art will recognize that there are numerous variations and modifications of this invention that are encompassed by its scope. Accordingly, the description of the preferred embodiments should not be deemed to limit the scope of the present invention.

It is an object of some embodiments of the present invention to provide a method for preparing nanoscale aluminum oxides stable at high temperatures in the presence or absence of water and/or steam and having high-surface area, large pore volume, and medium to large mesopores high mesoporosity-suitable as catalysts supports, ceramic materials and adsorbents.

The present invention employs the use of a solvent deficient method of making small nanoparticles with tight size distributions to enable the production of high quality aluminum oxide materials stable at high temperatures in the presence or absence of water and/or steam and with high surface area and large mesopore volume. The invention also provides a means of manipulating the secondary structure or aggregation of the nanoparticles to systematically control the surface properties and pore structure of said materials as determined by the BET surface area, pore volume, and pore size from $N_2$ adsorption. Pore size of the aluminum oxide products can vary from small to large mesopores.

In one embodiment (referred to herein as the "One Step" method, the basic method of making alumina materials includes mixing a dry powdered (but can be hydrated) organic aluminum salt, preferably an alkoxide or phenoxide (or a mixture of such), an organic silicon compound (hereinafter described) and a small amount of water (in the event a non-hydrated salt is used) to form what is opined to be a complex metal hydroxide/metal-oxide hydroxide precursor material and a byproduct salt. The organic silicon compound may be added in an amount to provide up to about 1% to about 30 weight % of silica in the final product. The reaction is solvent deficient and the reaction mixture consists of a solid suspension or slurry. This condition is characterized as "solvent deficient" or "no solvent added" in that the small amount of water is sufficient to react with (hydrolyze) the aluminum alkoxide and the organic silicon compound, but not sufficient to solubilize the reactants. Typically, water may be provided in an amount to provide a molar ratio to aluminum of at least 3:1 and to silicon of at least 2:1. Larger amounts may be employed but not in sufficient quantities to solubilize the reactants. Upon further stirring, the slurry may thicken to a slightly-wet solid depending upon the reagents used. The entire mixing method to produce the precursor can be carried out at room temperature within 10-30 minutes to bring the reaction to completion. Reaction temperatures from 25 to 90° C. may be used. The intermediate so produced is opined to contain an aluminum hydroxide and/or aluminum oxide hydroxide. The precursor thus formed may optionally be air dried at room temperature or heated to a temperature sufficient to dehydrate the precursor. In one embodiment drying is carried out prior to calcination by heating at a temperature greater than 50° C., 80° C., or 100° C., less than 200° C., or 120° C., or a range constructed from any of the foregoing temperatures.

Subsequently, the precursor is calcined. Calcination produces thermally, stable silica doped aluminas. The calcination can be carried out at a temperature equal to or greater than 300° C., 350° C., or 400° C., and equal to or less than 1200° C., 800° C., 600° C., 400° C., or a range constructed from any of the foregoing temperatures. Calcination at 500-1200° C. is preferred. The calcination can be carried out for a period of time greater than 10 minutes, 30 minutes, 1 hour, 2 hours, or 5 hours and various ramp rates may be used such as 0.5-10° C./min. Ramp rates of 0.5 to 3° C. are preferred. Calcination at preferred conditions produces highly thermally stable silica-doped aluminas in mostly the gamma phase.

The drying and calcination can be carried out as separate discrete steps in the same or different heating vessels or as a single step (i.e., the drying step may be a single step that transitions to calcination).

The method may also be modified by washing the precursor material prior to calcination, or the alumina may be washed after calcination.

In another embodiment referred to herein as the "Two Step" method, in the first step an organic aluminum salt, typically an aluminum alkoxide or phenoxide or mixtures thereof, is mixed with a small amount of water to provide sufficient water for the reaction as described above to produce a nanoparticle precursor opined to contain aluminum hydroxide and/or aluminum oxide hydroxide which form a slurry. This precursor (with or without the drying step as described above) is calcined to form aluminum oxide nanoparticles. As above, the calcination can be carried out at a temperature greater than 300° C., 350° C., or 400° C., and less than 1200° C., 800° C., 600° C., 400° C., or a range constructed from any of the foregoing temperatures. The calcination can be carried out for a period of time greater than 10 minutes 30 minutes, 1 hour, 2 hours, or 5 hours and various ramp rates may be used such as 0.5-10° C./min. In the second step, the aluminum oxide so formed is then mixed with an organic silicon compound (described hereafter) and a small amount of water sufficient to hydrolyze the organic silicon compound. The silicon added may vary in concentration, but is typically employed in an amount to provide from about 1% to about 30% by weight of silica in the final product. The mixture of the organic silicon compound and aluminum oxide is then calcined under the conditions, temperatures, times, and heating rates as the calcination described above for Step 1. Calcination under preferred conditions produces highly thermally stable silica doped aluminas. Additional details regarding methods for making a solvent deficient precursor mixture and the reagents that can be used to make solvent deficient precursor mixtures are disclosed in the co-pending U.S. Provisional Patent Application No. 61/340,762 corresponding to application Ser. No. 13/069,317, filed Mar. 22, 2011 which is hereby incorporated herein by reference in its entirety.

Suitable organic aluminum starting reagents used in this invention are generally aluminum organic salts such as alkoxides and phenoxides. Examples are aluminum isopropoxide (AIP), aluminum sec butoxide (Abu), aluminum tert butoxide (ATB), aluminum ethoxide (AEt), aluminum propoxide (ApO), aluminum pentoxide, and aluminum phenoxide (Aph). They may generally be represented by the formula $Al(O-R)_3$ where R is $C_1$-$C_{12}$ alkyl, $C_5$-$C_{12}$ cycloalkyl, aryl or combinations thereof.

The organic silicon compounds used as reagents in this invention are a broad class of compositions generally characterized as silicon oxides. They may also be characterized as silanes (silane derivatives) and silicates. They may be generally represented by the following formula:

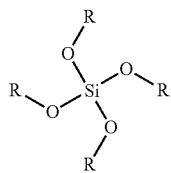

Wherein R is alkyl or aryl and can be about $C_1$-$C_{12}$ alkyl, $C_5$-$C_{12}$ cycloalkyl, phenyl, naphthyl and the like. R may also be a polyalkyl siloxane radical represented by the following structure:
wherein n=2-4
Representative compounds are tetraethyl orthosilicate (TEOS), tetera-n-butoxysilane, (TNBS), tetra n-propoxy silane (TNPS), polydimethyl siloxane (PDMS), and triethoxy methyl silane (TEOMS). TEOS is a preferred compound. The organic silicon compound is typically employed in an amount to provide from about 1% to about 30%, and preferably about 5-10% by weight of silica in the final product in both One Step and Two Step Methods including any amount within these ranges.

The pore structure of the aluminas can also be controlled by dilution of the starting materials with a liquid. The addition of small amounts of liquids to the solvent deficient slurry will result in substantial changes in the porous characteristics of the product. The diluent may be water, an alcohol, ketone, ether, or other liquids that are generally useful as solvents when dissolving metal salts. However, when used in the present invention, the diluent is added in concentrations that do not dissolve the aluminum salts in the precursor mixture.

The diluent may be included in the precursor mixture in molar ratios of diluent to aluminum alkoxide or phenoxide in a range from 1:0.5 to 1:10 or any number or range between. For example, with aluminas prepared from aluminum sec-butoxide, the pore diameter can be varied by three fold and the pore volume by four fold with the addition of small amounts of water (but still maintaining the solvent deficient environment.) The pore structure can also be controlled by rinsing the precursor material prior to calcination with various solvents. For example, in the case of aluminas prepared from aluminum isopropoxide, the pore diameter can be varied by almost seven fold by rinsing the precursor with various organic solvents.

The aluminas produced by this invention are highly thermally stable and can have higher surface areas, larger pore volumes, and generally have larger mesopores following treatment at elevated temperatures than aluminas reported in the prior art, with only a few exceptions, in which case the thermal stability and pore volume are generally comparable. The methods of the present invention are also relatively simple, scalable, and designed to be commercially economical compared to methods reported in prior art processes. For example, after calcination temperatures of 1200° C. the silica-doped alumina maintains surface areas of >100 $m^2$/g, pore volumes >0.5 $cm^3$/g. and pore diameters >20 nm. Ceramic silica-alumina porous membranes prepared from the silica-aluminas of this invention can also be used in aggressive media, steam, or high temperature applications. They are preferred over polymeric membranes due to their long life, ecological benefits, and their chemical and thermal stability. They also can be used in gas separation and purification and in numerous filtration applications. Importantly, the silica-aluminas of this invention remain in the gamma phase at high temperature. γ-Aluminas produced by methods in the current art often exhibit substantial grain growth and loss of surface area as they are exposed to higher temperatures, and all reported examples transition to the θ or α-phases at temperatures from 1100° C. to 1200° C. The α-phase is characterized by excessive grain growth and collapse of the porous structure. The silica doped aluminas of the present invention may also be subject to grain growth and loss of surface area, but to a lesser extent, and they remain in the γ-phase with conserved pore structure up to 1200° C. to 1250° C. Thus, the silica-doped aluminas of this invention have significant benefits in the properties mentioned over similar materials reported in the prior art.

The following examples are presented to more completely describe the present invention, and comparison examples are also included to demonstrate the benefits of the invention. The examples are provided for illustrative purposes only. Various modifications or changes in light thereof will be obvious to persons skilled in the art and are to be included within the spirit and purview of this application. The invention can take other specific forms without departing from the spirit or essential attributes thereof. In all examples, BET surface area and mesopore volume were determined by $N_2$ adsorption at 77 K and pore diameter was calculated from the hysteresis region of each isotherm using the improved slit pore geometry (SPG) model for large pore size using the desorption branch.

Example 1

Figure 5B:
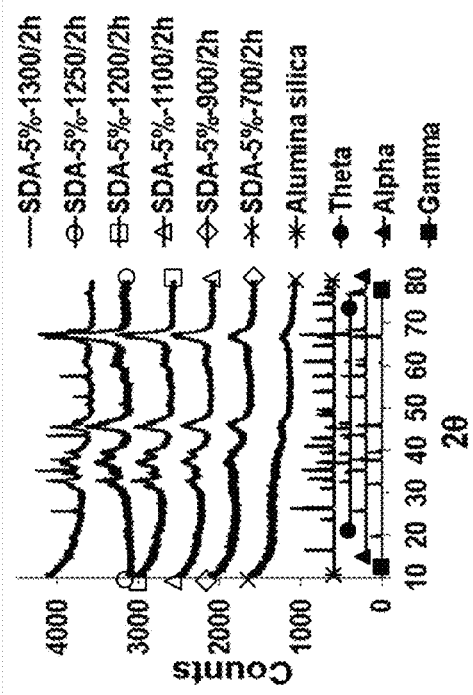
FIG. 5 shows XRD patterns of different aluminas calcined at different temperatures for 2 hr. A) Example 7, 0% silica, B) 5% doped alumina (Example 1), C) 15% doped alumina (Example 8) and D) 27% doped alumina (Example 9). The standards for various alumina phases as described in Example 1 are also shown.

In a preferred embodiment, water is added to aluminum isopropoxide (AIP) in a 1:5 mole ratio, immediately followed by adding the equivalent of 5 wt. % silica in the form of TEOS. The reagents are mixed for 30 minutes by a Bosch kitchen mixer to form the precursor and the precursor is calcined at 700° C. for 2 hrs (ramp rate 2° C./min) to produce the thermally stable silica doped alumina (SDA). Table 2 includes BET data for 5 wt. % SDA thermally treated at 700° C., 900° C., 1100° C. and 1200° C. for 2 hrs (ramp rate 2° C./min). Following calcination at 1100° C. a surface area of 160 m$^2$/g, a pore volume of 0.99 cm$^3$/g, and a bimodal pore size distribution with peaks at 23 and 52 nm are observed. FIGS. 1A and 5B show that the principal phase of the SDA treated at 1250° C. is γ-Al$_2$O$_3$. Peaks attributed to α-Al$_2$O$_3$ are not observed until the sample is calcined at 1300° C.

Example 2

Figure 2:
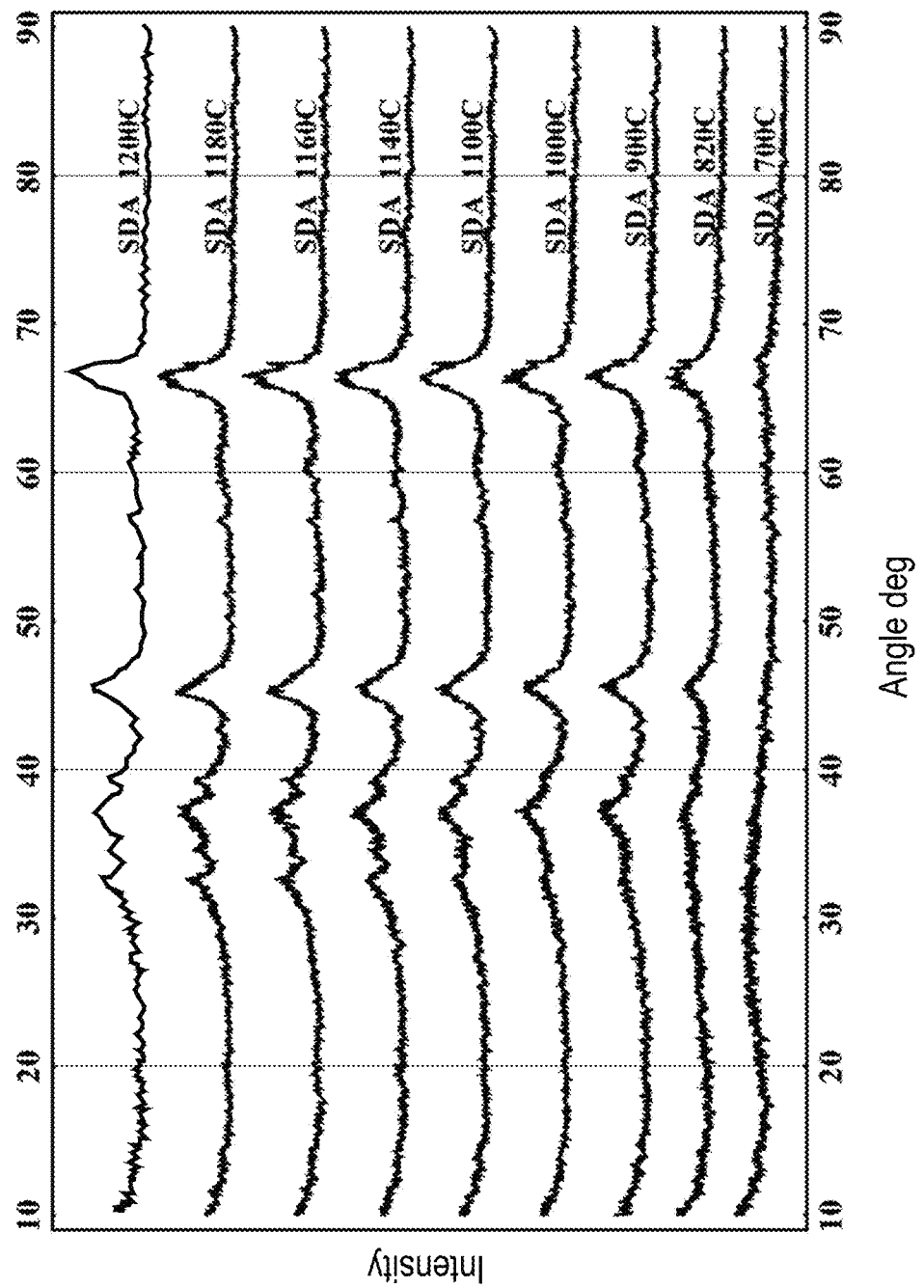
FIG. 2 shows XRD patterns of a 5% doped alumina from Example 2 calcined at different temperatures from 700-1200° C. and stability of the sample over this range.

A sample from Example 1 which had been previously air-calcined at 700° C. was loaded in an in situ XRD cell, ramped to 700° C. in air, and held for 30 minutes; the XRD spectrum was scanned and the temperature was ramped to 800° C. and held for 30 minutes, then scanned, etc. up through 1200° C. FIG. 2 shows in situ high-temperature XRD patterns in air. It is evident that the γ-Al$_2$O$_3$ phase in 5% SDA is stable to 1200° C. without transforming to either theta (θ) or α-alumina.

Example 3

Figure 3A:
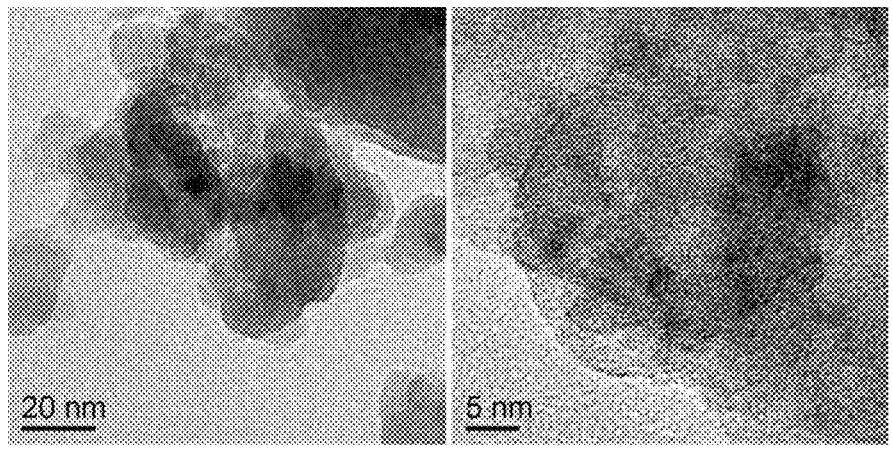
FIG. 3 shows TEM micrographs of A) 5% silica doped alumina calcined at 700° C., and B) 5% silica doped alumina calcined at 1100° C. The SDA's were prepared as described in Example 3.
Figure 3B:
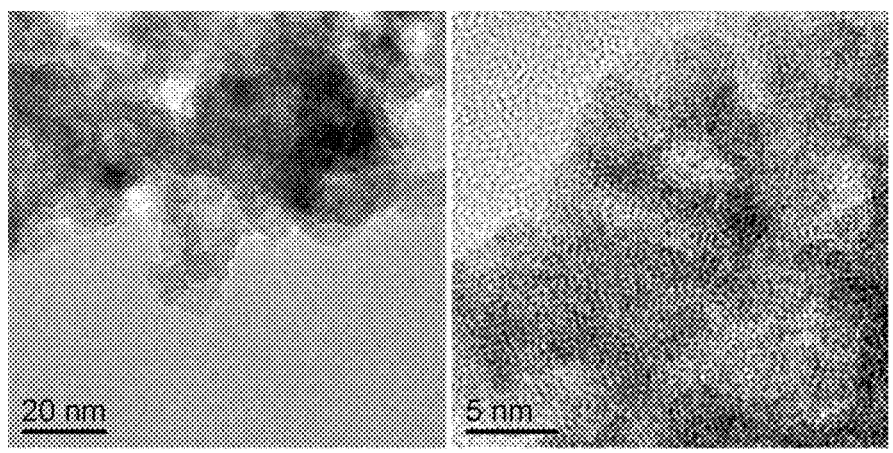

A sample from Example 1 calcined at 700° C. was studied by TEM. TEM images (FIG. 3A) show that primary particles of 5% SDA are plate-like, having an average length of 20 nm, an average width of 15 nm; and a thickness of about 5 nm based on XRD calculations using the Scherrer formula. At higher temperatures, i.e. 1100° C., (FIG. 3B), the shape and size of the 5% SDA primary particle remains relatively small, no significant grain growth due to sintering from gamma to alpha phase transition is observed.

Example 4

Figure 1B:
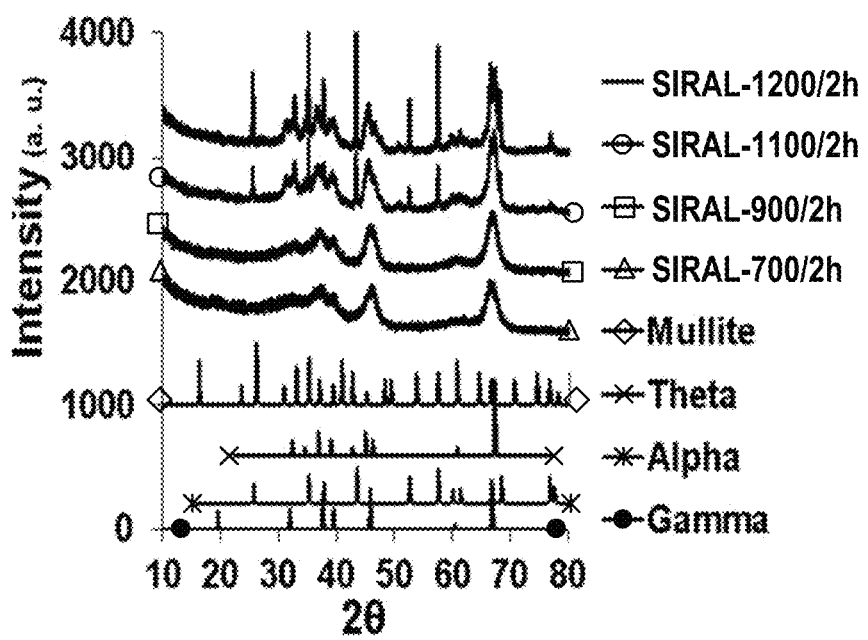
FIG. 1 shows XRD patterns of 5% silica doped alumina (SDA) from Example 1 (FIG. 1A) calcined at different temperatures for 2 hrs and in FIG. 1B) a commercially available alumina, Sasol 5% silica doped alumina, "SIRAL-5" (from Example 4) calcined at different temperatures.

In comparative experiments, a sample of commercial silica-doped alumina ("SIRAL") from Sasol Inc. was calcined at 700° C., 900° C., 1100° C. and 1200° C. for 2 hrs. (ramp rate 5 hrs.). FIG. 1B shows the XRD patterns where the SIRAL transitioned from the γ to α phase at 1100° C., while the 5% silica doped alumina of this invention remains in γ phase to 1200° C. as shown in FIG. 1A.

TABLE 2

BET results of 0, 5, 15, 27% silica doped aluminas (SDAs) after heating at different temperatures for 2 hours

| Silica % | Calcination T (° C./2 hrs) | BET surface area (m$^2$/g)$^a$ | Mesopore volume (cm$^3$/g)$^a$ | Pore diameter (nm)$^b$ | Standard deviation (nm) |
|---|---|---|---|---|---|
| 0% | 700° C. | 291 | 1.56 | 19.8 | 1.1 |
| | 900° C. | 208 | 1.12 | 25.5 | 1.2 |
| | 1100° C. | 119 | 0.77 | 26.7 | 1.6 |
| | 1200° C. | 15 | 0.05 | 0.00 | — |
| 5% | 700° C. | 378 | 1.83 | 14.7 and 35.0 | 1.8 |
| | 900° C. | 300 | 1.60 | 19.8 and 51.8 | 1.8 |
| | 1100° C. | 160 | 0.99 | 22.5 and 52.0 | 1.8 |
| | 1200° C. | 111 | 0.59 | 29.4 | 1.6 |
| 15% | 700° C. | 222 | 1.40 | 43.1 | 1.8 |
| | 900° C. | 180 | 1.10 | 39.2 | 1.8 |
| | 1100° C. | 146 | 0.96 | 33.6 | 1.6 |
| | 1200° C. | 100 | 0.66 | 31.1 | 1.6 |
| 27% | 700° C. | 195 | 1.0 | 51.6 | 1.5 |
| | 900° C. | 143 | 0.89 | 51.3 | 1.4 |
| | 1100° C. | 100 | 0.57 | 45.4 | 1.8 |
| | 1200° C. | 65 | 0.33 | 48.6 | 1.9 |

$^a$Determined by N$_2$ adsorption at 77 K.
$^b$Determined by an improved slit pore geometry (SPG) model for large mesopore aluminas using the desorption branch.

Example 5

Figure 4A:
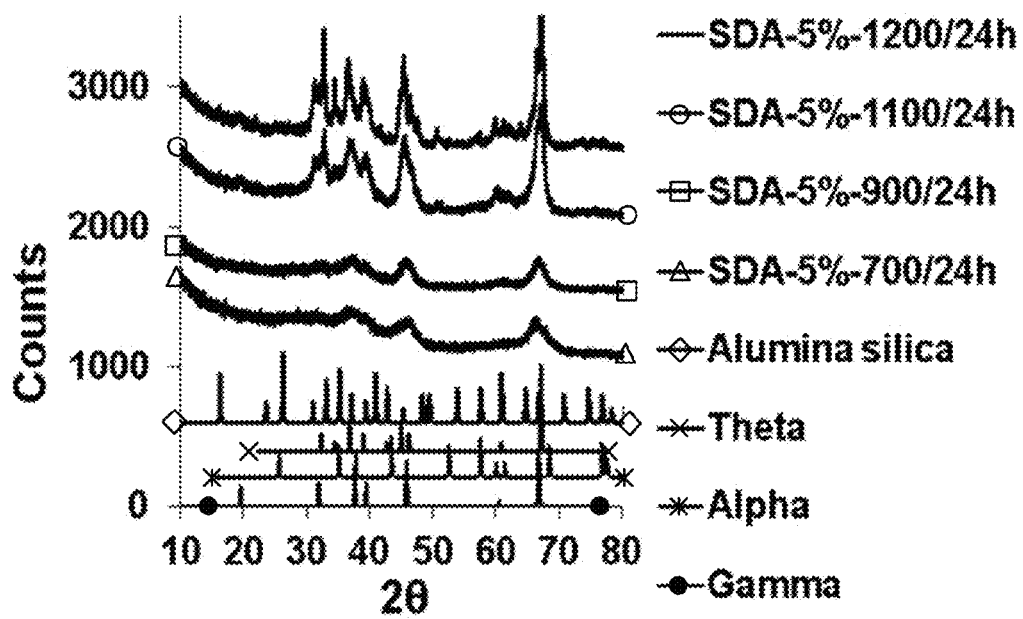
FIG. 4 shows XRD patterns of A) an SDA (Example 5) 5% doped alumina calcined at different temperatures for 24 hrs, and B) "Sasol" 5% doped alumina (Example 6, "SIRAL-5") calcined at different temperatures for 24 h. The standards for various alumina phases as described in Example 1 are also shown.

Aliquots of SDA produced in Example 1, were thermally treated at 700° C., 900° C., 1100° C. and 1200° C. for 24 hrs (ramp rate 5 hrs). Table 3 includes BET data and FIG. 4A shows XRD patterns which indicate that γ phase and trace of θ phase are seen at 1200° C.

Example 6

Figure 4B:
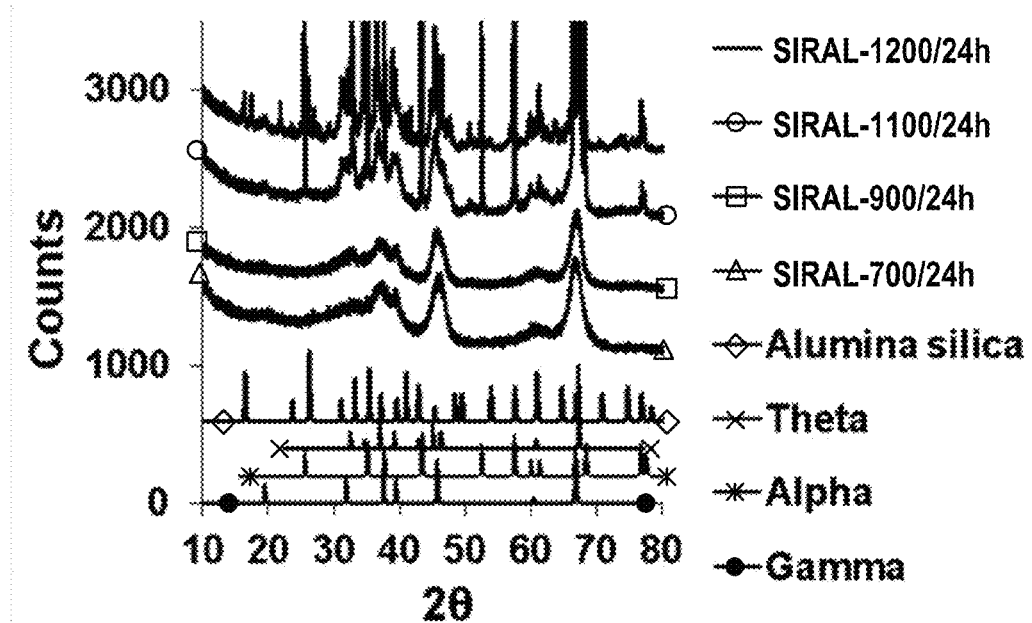

For comparative experiments, commercial silica doped alumina ("SIRAL") from Sasol Inc. was calcined at 700° C., 900° C., 1100° C. and 1200° C. for 24 hrs (ramp rate 5 hrs). Table 2 includes surface area and porosity data and FIG. 4B shows the XRD patterns where the SIRAL transitions from the γ to α phase at 1100° C. while the 5% silica doped alumina of this invention remains in γ phase to 1200° C. as shown in FIG. 4A.

TABLE 3

BET results of 5% silica doped aluminas (SDAs) and "SIRAL" 5 calcined at different temperature for 24 h

| Sample ID | BET surface area (m$^2$/g) | | | | Mesopore volume (cm$^3$/g) | | | | Pore Diameter (nm) | | | |
|---|---|---|---|---|---|---|---|---|---|---|---|---|
| | 700° C. | 900° C. | 1100° C. | 1200° C. | 700° C. | 900° C. | 1100° C. | 1200° C. | 700° C. | 900° C. | 1100° C. | 1200° C. |
| 5% SDA | 349 | 270 | 131 | 61 | 1.06 | 1.11 | 0.84 | 0.24 | 16.5 | 18.7 | 23.7 and 51.3 | 20.0 |
| Siral-5 | 262 | 203 | 90 | 28 | 0.61 | 0.56 | 0.33 | 0.13 | 8.8 | 10.5 | 12.4 | 18.6 |

5% SDA: 5% silica doped alumina.
Siral-5: Sasol 5% silica doped alumina.

Example 7

Figure 5D:
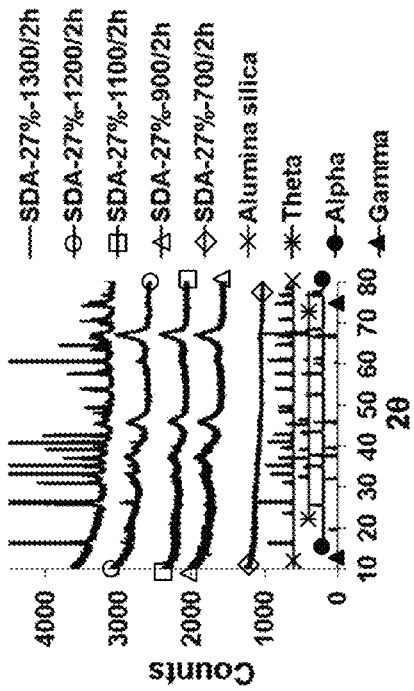
Figure 5A:
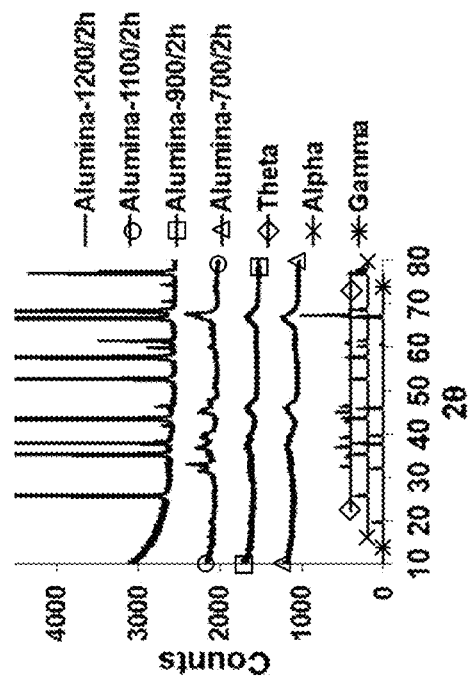

For comparative purposes, Example 1 was repeated except no dopant was used. It was thermally treated for 2 hrs (ramp rate 5 hrs) at the same temperatures. Table 2 includes surface area and porosity data for the 0 wt. % silica batch which show significant deterioration of the surface area and pore structure with increasing temperatures as it transitioned to the alpha crystalline phase (FIG. 5A).

Example 8

Figure 5C:
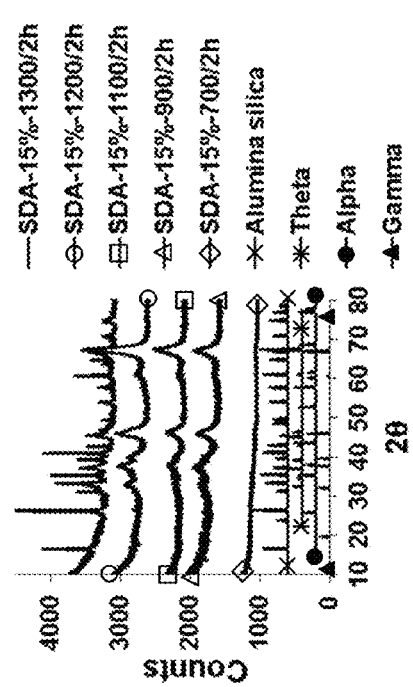

Example 1 was repeated except 15 wt. % silica based on alumina in the final product was used. It was thermally treated for 2 hrs (ramp rate 5 hrs) at the same temperatures. Table 2 includes surface area and porosity data for the 15 wt. % silica batch. FIG. 5C shows XRD patterns of the 15% silica batch which remains in γ-$Al_2O_3$ phase at 1200° C.

Example 9

Example 1 was repeated except 27 wt. % silica based on the weight of alumina in the final sample was used. It was thermally treated for 2 hrs (ramp rate 5 hrs) at the same temperatures. Table 2 includes surface area and porosity data. Alpha peaks are observed at 1100° C. (FIG. 5d). Table 2 shows that 5 wt. % has the highest surface area and largest porosity at higher temperatures compared to others, but all of the TEOS doped samples were significantly better thermally stabilized than the control.

Example 10

Figure 6:
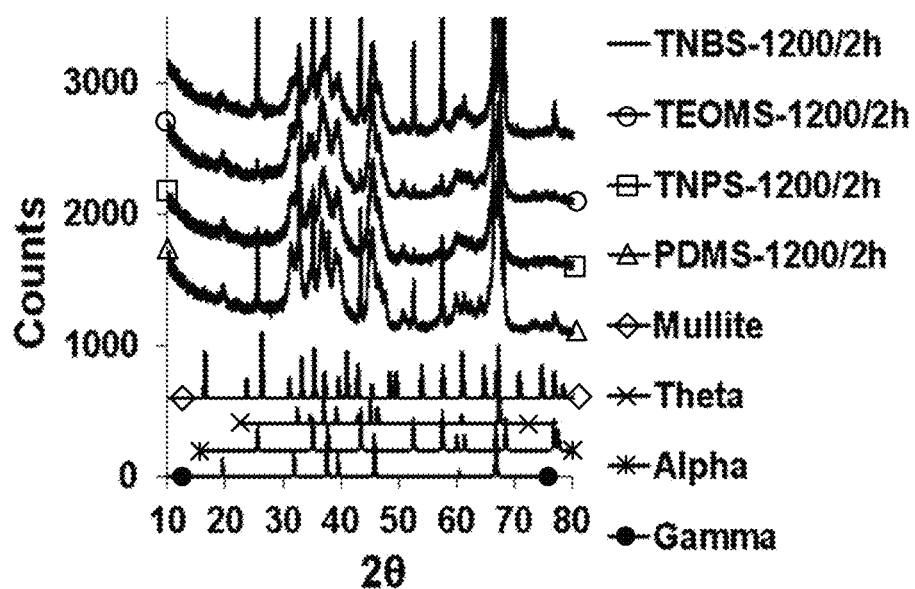
FIG. 6 shows XRD patterns of silica doped alumina (Examples 10-13) from different organic silicons after calcining at 1200° for 2 hrs. The standards for various alumina phases as described in Example 1 are shown.

A sample was made according to Example 1 except 5 wt % tetra-n-butoxysilane (TNBS) was substituted for the 5 wt % TEOS. Surface area and porosity remained high after calcination at 1200° C. for 2 hours (Table 4). XRD shows (FIG. 6) alpha and gamma at 1200° C.

Example 11

A sample was made according to Example 1 except 5 wt % tetra n-propoxy silane (TNPS) was substituted for the 5 wt % TEOS. The surface area, pore volume, and pore diameter were still adequately high after calcination at 1200° C. for 2 hours (Table 4). XRD shows (FIG. 6) that the SDA is stable with theta and gamma phases at 1200° C.

Example 12

A sample was made according to Example 1 except 5 wt % polydimethyl siloxane (PDMS) was substituted for the 5 wt % TEOS. The surface area, pore volume, and pore diameter were still adequately high after calcination at 1200° C. for 2 hours (Table 4). XRD shows (FIG. 6) that the sample contained some alpha with the gamma phase at 1200° C.

Example 13

A sample was made according to Example 1 except 5 wt % triethoxy methyl silane (TEOMS) was substituted for the 5 wt % TEOS. Surface area, pore volume, and pore diameter were still adequately high after calcination at 1200° C. for 2 hours (Table 4). XRD shows (FIG. 6) that the SDA is stable with theta and gamma phases at 1200° C.

Example 14

For comparative purposes a sample was made according to Example 1 except 5 wt % Lanthanum nitrate (LaN) was substituted for 5 wt % TEOS. Substantial decreases in surface area and porosity (Table 4) show that the sample was not stabilized and XRD shows that it is in the alpha phase at 1200° C.

Example 15

For comparative purposes, a sample was made according to Example 1 except 5 wt % silicic acid (SA) was substituted for the 5 wt % TEOS. Substantial decreases in surface area and porosity (Table 4) show that the sample was not stabilized and XRD shows that it is in the alpha phase at 1200° C.

TABLE 4

BET results of silica doped alumina (SDA) using different silica sources after heating at different temperatures for 2 hours

| 5% different silica sources | CalcinationT (° C./2 hrs) | BET surface area $(m^2/g)^a$ | Mesopore volume $(cm^3/g)^a$ | Pore diameter $(nm)^b$ | Standard deviation (nm) | XRD phase |
|---|---|---|---|---|---|---|
| PDMS* | 700° C. | 358 | 1.58 | 11.8, 52.8 | 2.1, 1.7 | Alpha + gamma |
| | 900° C. | 272 | 1.54 | 16.2, 51.3 | 1.4, 1.7 | |
| | 1100° C. | 145 | 0.84 | 40.88 | 2.6 | |
| | 1200° C. | 80.5 | 0.44 | 42.24 | 2.2 | |
| TEOMS* | 700° C. | 291 | 1.54 | 18.5, 46.2 | 1.6, 1.7 | Theta + gamma |
| | 900° C. | 252 | 1.31 | 24.4 | 1.5 | |
| | 1100° C. | 152 | 0.88 | 22.45 | 1.5 | |
| | 1200° C. | 84.8 | 0.46 | 20.9 | 1.5 | |
| TNBS* | 700° C. | 305 | 1.76 | 18.3, 46.8 | 1.4, 1.7 | Alpha + gamma |
| | 900° C. | 233 | 1.41 | 11.4, 54.7 | 6.9, 1.0 | |
| | 1100° C. | 145 | 0.93 | 39.9 | 2 | |
| | 1200° C. | 76.2 | 0.46 | 39.7 | 1.9 | |
| TNPS* | 700° C. | 320 | 1.88 | 19.8, 50.8 | 1.7, 1.6 | Theta + gamma |
| | 900° C. | 280 | 1.89 | 19.3, 49.0 | 1.9, 1.6 | |
| | 1100° C. | 169 | 1.15 | 30.6 | 1.6 | |
| | 1200° C. | 99.6 | 0.64 | 27.2 | 1.6 | |
| SA* | 1200° C. | No stability | | | | Alpha |
| LaN* | 1200° C. | No stability | | | | Alpha |

PDMS*: polydimethyl siloxane
TEOMS*: Triethoxymethyl silane
TNBS*: Tetra-n-butoxysilane
TNPS*: Tetra n-proxy silane
SA*: silicic acid
LaN*: Lanthanum nitrate

Example 16

Figure 7A:
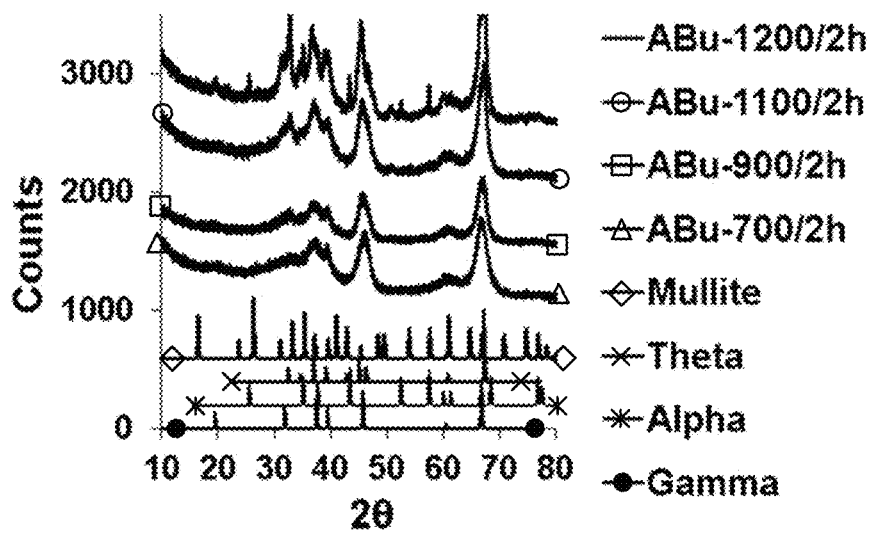
FIG. 7 shows XRD patterns of silica doped aluminas from Examples 16 (FIG. 7A) and Example 18 (FIG. 7B.) Standards for alumina phases as described in Example 1 are shown.

A sample was made according to Example 1 except aluminum sec butoxide (ABu) was substituted for the aluminum isopropoxide. Surface area, pore volume, and pore diameter listed in Table 5 differ from those for the SDA derived from aluminum isopropoxide, but it is also thermally stabilized. The XRD spectra indicate that aluminum sec-butoxide derived SDA is mostly gamma at 1200° C. (FIG. 7A).

Example 17

A sample was made according to Example 1 except aluminum tert butoxide (ATB) was substituted for the aluminum isopropoxide. Table 5 shows that the SDA is mostly gamma at 1200° C.

Example 18

Figure 7B:
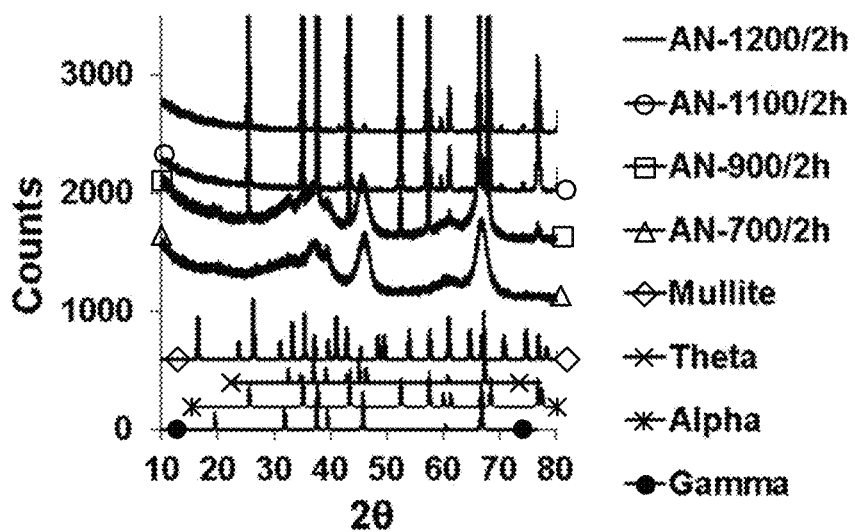

For comparative purposes, a sample was made according to Example 1 except aluminum nitrate (AN) was substituted for the aluminum isopropoxide. Relatively low values of surface area, pore volume, and pore diameter listed in Table 5 indicate that this inorganic aluminum source does not produce a thermally stabilized product. The XRD spectra indicate that the SDA is not stable and it is in the alpha phase at 1200° C. and (FIG. 7B).

TABLE 5

BET results of silica doped alumina (SDA) using different aluminum sources after heating at different temperatures for 2 hours

| Aluminum source | CalcinationT (° C./2 hrs) | BET surface area $(m^2/g)^a$ | Mesopore Volume $(cm^3/g)^a$ | Pore Diameter $(nm)^b$ | Standard deviation (nm) | XRD phase |
|---|---|---|---|---|---|---|
| ABu* | 700° C. | 392 | 1.13 | 17.1 | 1.44 | Theta + trace |
|  | 900° C. | 299 | 1.32 | 18.3 | 1.1 | alpha |
|  | 1100° C. | 182 | 0.86 | 22.8 | 1.65 |  |
|  | 1200° C. | 110 | 0.59 | 23.6 | 1.35 |  |
| AN* | 700° C. | 252 | 0.31 | 3.5 | 2.24 | Alpha |
|  | 900° C. | 192 | 0.198 | 3.6 | 2.19 |  |
|  | 1100° C. | 5 | 0.11 | 0.1 | — |  |
|  | 1200° C. | 8 | 0.06 | 0 | — |  |
| ATB* | 1200° C. | 70 | 0.42 | 19.5 | 1.2 | Gamma + alpha |

ABu*: Aluminum sec-butoxide
AN*: Aluminum nitrate
ATB*: Aluminum tert-butoxide

Example 19

Figure 8:
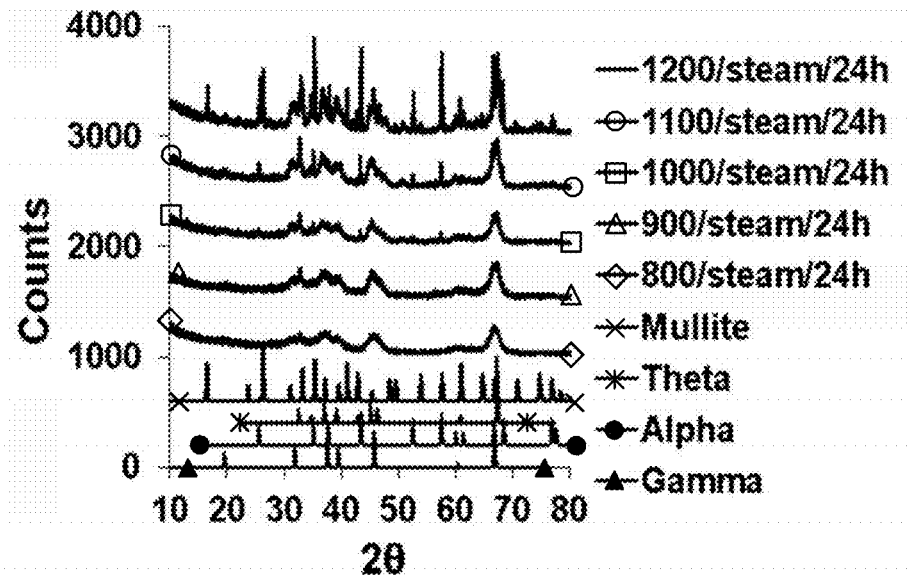
FIG. 8 shows XRD patterns of 5% silica doped alumina (Example 19) hydrothermally treated with water for 24 hours at different temperatures. Standards for alumina phases as described in Example 1 are shown.

Sample from example 1 was thermally treated in presence of water (0.16 ml/min) for 24 hr at temperatures from 800° C. to 1200° C. Table 6 shows that surface area and porosity are also stable up to 1200° C. in the presence of steam, and FIG. 8A shows that the alumina of this Example is mostly in gamma phase at 1100° C.

TABLE 6

BET of 5% silica doped alumina (SDA) hydrothermally treated with water for 24 hours at different temperatures.

| BET surface area $(m^2/g)^a$ | | | | | Mesopore volume $(cm^3/g)^a$ | | | | | Pore Diameter $(nm)^b$ | | | | |
|---|---|---|---|---|---|---|---|---|---|---|---|---|---|---|
| 700 | 900 | 1000 | 1100 | 1200 | 700 | 900 | 1000 | 1100 | 1200 | 700 | 900 | 1000 | 1100 | 1200 |
| 199 | 166 | 124 | 105 | 48 | 1.16 | 1.20 | 0.92 | 0.81 | 0.40 | 34.8 | 37.4 | 39.0 | 41.8 | 46.28 |

Example 20

Figure 9:
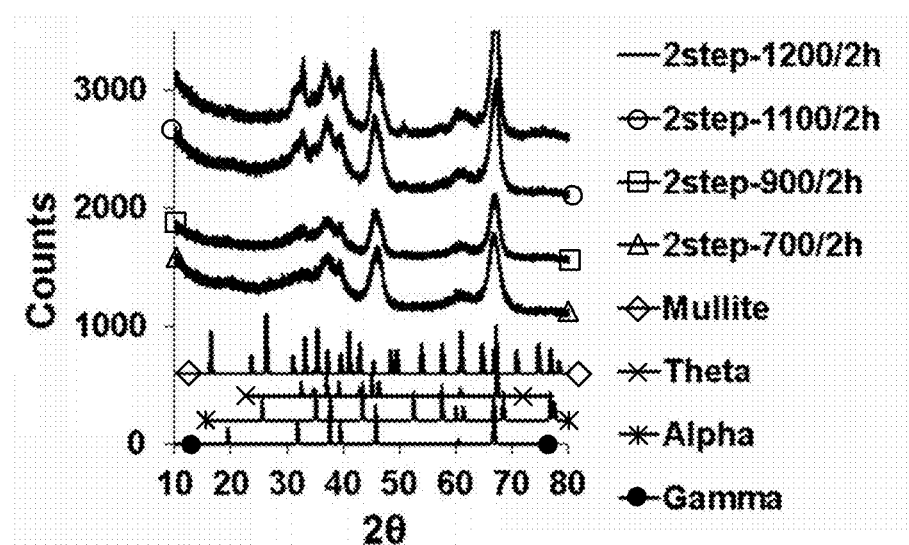
FIG. 9 shows XRD patterns of 5% silica doped alumina (Example 20) calcined using the Two Step method at different temperatures for 2 hrs. Standards for alumina phases as described in Example 1 are shown.
Figure 10:
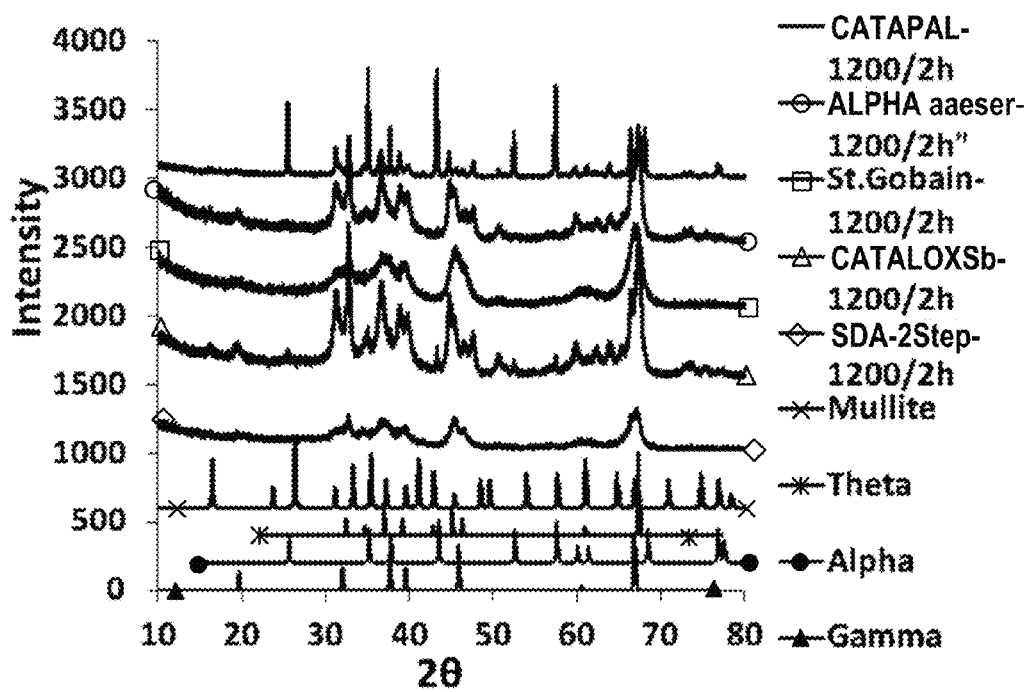
FIG. 10 shows XRD patterns of commercial aluminas (Examples 30-33) after adding TEOS and calcining at different temperatures for 2 hrs and one sample prepared by the two step method of Example 20 ("SDA".) Standards for alumina phases as described in Example 1 are shown.

Two-Step: Water and aluminum isopropoxide were mixed in a 1:5 mole ratio for 15 min and calcined to 700° C. for 2 hrs (ramp rate 5 hrs) to produce pure alumina. TEOS was added to the alumina to give a final concentration of 5% wt/wt silica/alumina and mixed for 30 minutes in Bosch kitchen mixer, then calcined at 700° C., 900° C., 1100° C. and 1200° C. for 2 hrs (ramp rate 5 hrs). Surface area and porosity data indicate that this two-step method also produces a thermally stable alumina product (Table 7). The XRD spectrum indicates it is γ-alumina with a trace of 0 at 1200° C. (FIGS. 9 and 10, "SDA" in FIG. 10).

TABLE 7

BET results of 5% silica doped alumina (SDA) using 2-step method after heating at different temperatures for 2 hours

| Temperature | BET surface area $(m^2/g)^a$ | Mesopore volume $(cm^3/g)^a$ | Pore diameter $(nm)^b$ | Standard deviation (nm) |
|---|---|---|---|---|
| 700 | 296.4 | 1.37 | 14.04 | 1.30 |
| 900 | 262.4 | 1.31 | 15.55 | 1.29 |
| 1100 | 180.5 | 0.87 | 14.48 | 1.22 |
| 1200 | 119.7 | 0.53 | 13.69 | 1.23 |

Example 21

A sample was made according to Example 20 except 5 wt % tetra-n-butoxysilane (TNBS) was substituted for the 5 wt % TEOS. XRD shows (Table 8) that the TNBS product transformed to alpha and gamma at 1200° C.

Example 22

A sample was made according to Example 20 except 5 wt % tetra n-propoxy silane (TNPS) was substituted for the 5 wt % TEOS. XRD shows (Table 8) that the TNPS product theta and gamma phases at 1200° C., indicating significant stability.

Example 23

A sample was made according to Example 20 except 5 wt % polydimethyl siloxane (PDMS) was substituted for the 5 wt % TEOS. XRD shows (Table 8) that the PDMS sample transformed to alpha at 1200° C.

Example 24

A sample was made according to Example 20 except 5 wt % triethoxy methyl silane (TEOMS) was substituted for the 5 wt % TEOS. XRD shows (Table 8) that the TEOMS product contains theta and gamma phases at 1200° C., indicating significant stability.

Example 25

For comparison purposes, a sample was made according to Example 21 except 5 wt % silicic acid (SA) was substituted for the 5 wt % TEOS. XRD shows (Table 8) that this sample transformed to alpha and gamma at 1200° C.

TABLE 8

XRD phase results of silica doped alumina (SDA) using different silica sources after heating at 1200° C. for 2 hours.

| Silica sources 5% | XRD phase at 1200° C. |
|---|---|
| SA* | $\alpha + \gamma$ |
| TEOMS* | $\theta + \gamma$ |
| PDMS* | $\alpha$ |
| TNPS* | $\theta + \gamma$ |
| TNBS* | $\alpha + \gamma$ |

SA*: silicic acid
TEOMS*: Triethoxymethyl silane
PDMS*: polydimethyl siloxane
TNPS*: Tetra n-proxy silane
TNBS*: Tetra-n-butoxysilane

Example 26

A sample was made according to Example 20 except aluminum sec butoxide (ABu) was substituted for the aluminum isopropoxide. Table 9 shows that SDA is thermally stable and mostly gamma at 1200° C.

Example 27

A sample was made according to Example 20 except aluminum tert butoxide (ATB) was substituted for the aluminum isopropoxide. Table 9 shows that SDA is thermally stable and mostly gamma at 1200° C.

Example 28

A sample was made according to Example 20 except aluminum phenoxide (APh) was substituted for the aluminum isopropoxide. Table 9 shows that SDA is thermally stable and mostly gamma at 1200° C.

Example 29

A sample was made according to Example 20 except aluminum ethoxide (AEt) was substituted for the aluminum isopropoxide. Table 9 shows that SDA is thermally stable and mostly gamma at 1200° C.

TABLE 9

XRD phase results of silica doped alumina (SDA) using different aluminum sources after heating at 1200° C. for 2 hours.

| Silica sources 5% | XRD phase at 1200° C. |
|---|---|
| A-Bu* | Mostly gamma |
| ATB* | Mostly gamma |
| APh* | Mostly gamma |
| AEt* | Mostly gamma |

A-Bu*: Aluminum butoxide
ATB*: Aluminum tert-Butoxide
APh*: Aluminum phenoxide
AEt*: Aluminum ethoxide

Example 30

For comparative purposes, "CATAPAL", a commercial pure alumina material obtained from Sasol, Inc. was purchased. 5% TEOS was added to the alumina followed by mixing. Following calcination at 1200° C. for 2 hrs (ramp rate 5 hrs) the XRD pattern (FIG. 10) indicates that CATAPAL transitions to α-alumina by 1200° C.

Example 31

For comparative purposes, "CATALOX"-SBa-90 a commercial gamma alumina obtained from Sasol, Inc. was calcined at 700° C. for 2 hrs (ramp rate 5 hrs) to produce γ-alumina. 5% TEOS was added to the calcined alumina followed by mixing. Following calcination at 1200° C. for 2 hrs (ramp rate 5 hrs) the XRD pattern (FIG. 10) indicates that it is not stable at 1200° C. and transforms to α-alumina.

Example 32

For comparative purposes, a "St.GOBAIN" moderately high pore volume gamma alumina was calcined at 700° C. for 2 hrs (ramp rate 5 hrs) to produce γ-alumina. 5% TEOS was added to the calcined alumina followed by mixing. Following calcination at 1200° C. for 2 hrs (ramp rate 5 hrs) the XRD pattern (FIG. 10) indicates that St. GOBAIN remains in gamma phase at 1200° C.

Example 33

For comparative purposes ALPHA-Aesar 99.9% gamma alumina (stock#: 43832, lot#: E08T034) was calcined at 700° C. for 2 hrs (ramp rate 5 hrs) to produce γ-alumina. 5% TEOS was added to the calcined alumina followed by mixing. Following calcination at 1200° C. for 2 hrs (ramp time 5 hrs) the XRD pattern (FIG. 10) indicates that ALPHA-Aesar is not stable at 1200° C. and transforms to α-alumina.

Example 34

Figure 11:
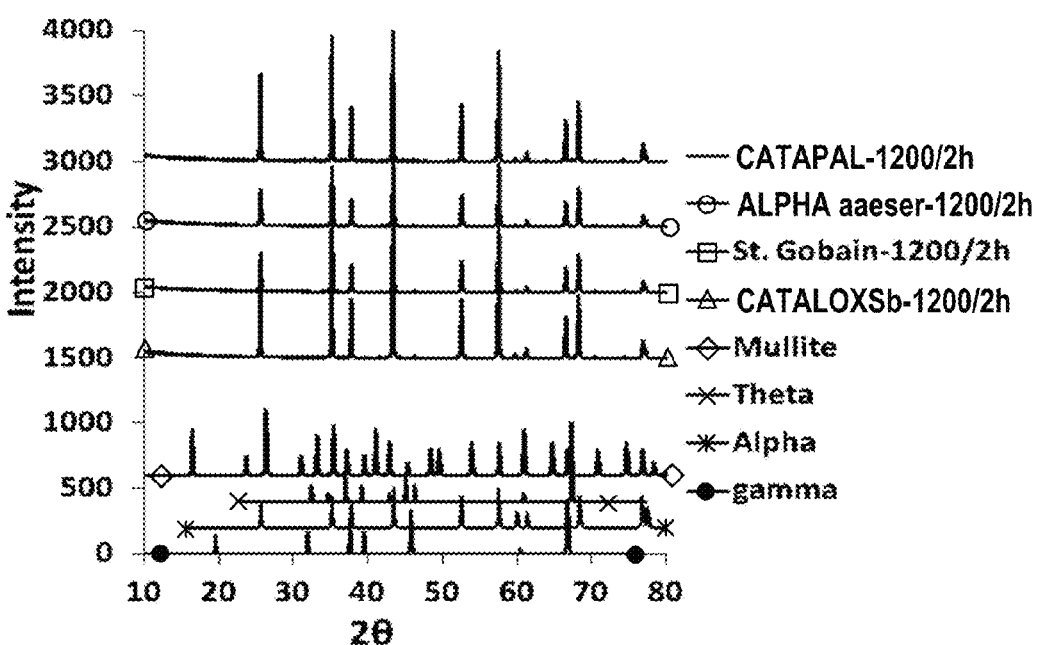
FIG. 11 shows XRD patterns of commercial aluminas with no dopant (Example 34) after calcining at 1200° C. for 2 hrs. Standards for alumina phases as described in Example 1 are shown.

For comparative purposes, FIG. 11 shows that several commercial aluminas are transformed to alpha alumina at 1200° C. without addition of an organic silicon compound.

What is claimed is:

1. A method for preparing a silicon-doped alumina consisting essentially of:

a) bringing together as reactants at least one aluminum salt from the group consisting of an aluminum alkoxide, aluminum phenoxide and combinations thereof and at least one of polydimethylsiloxane or an organic silicon compound of the structure

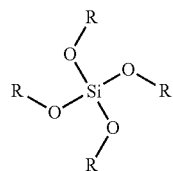

wherein R is selected from the group consisting of $C_1$-$C_{12}$ alkyl, $C_5$-$C_{12}$ cycloalkyl, aryl, a polyalkyl siloxane radical and combinations thereof, and water, in an amount sufficient to hydrolyze without dissolving the reactants, to produce an alumina nanoparticle precursor; and b) calcining the product of step (a) at a temperature of 300-1200° C.;

wherein said silicon-doped alumina is substantially in the gamma phase when heated to at least 1200° C. for 2 hours.

2. The method of claim 1 wherein the aluminum salt is represented by the formula $Al(O-R)_3$ where R is selected from the group consisting of $C_1$-$C_{12}$ alkyl, $C_5$-$C_{12}$ cycloalkyl, aryl and combinations thereof.

3. The method of claim 1 wherein the organic aluminum salt is selected from the group consisting of aluminum isopropoxide, aluminum sec-butoxide, aluminum phenoxide, aluminum ethoxide, aluminum tert-butoxide, and aluminum hexoxide.

4. The method of claim 1 wherein the aluminum salt is aluminum isopropoxide.

5. The process of claim 1 wherein the organic silicon compound is at least one compound having the following structure:

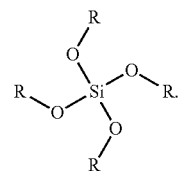

6. The method of claim 5 wherein R is selected from the group consisting of $C_1$-$C_{12}$ alkyl, $C_5$-$C_{12}$ cycloalkyl, aryl, a polyalkyl siloxane radical and combinations thereof.

7. The method of claim 6 wherein R is $C_1$-$C_{12}$ alkyl.

8. The method of claim 7 wherein the organic silicon compound is selected from the group consisting of tetraethyl ortho silicate, tetra-n-butyloxysilane, tetra n-propoxy silane, polydimethyl siloxane and triethoxy methyl silane.

9. The method of claim 1 wherein the organic silicon compound is employed in a proportion to provide about 1%-30% silica by weight of the final product.

10. The method of claim 1 wherein the organic silicon compound is employed in a proportion to provide about 1%-30% silica by weight of the final product.

11. The method of claim 1 wherein the reaction of step a) is carried out in the presence of a diluent selected from the group consisting of an alcohol, a ketone, an ether or a combination thereof to adjust the pore characteristics of the final product.

12. The method of claim 8 wherein the organic silicon compound is tetraethyl ortho silicate.

13. The method of claim 12 wherein the aluminum salt is aluminum isopropoxide.

* * * * *